(12) United States Patent
Baldwin

(10) Patent No.: US 12,531,403 B1
(45) Date of Patent: *Jan. 20, 2026

(54) POP-UP POWER SYSTEM

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,324

(22) Filed: May 17, 2024

Related U.S. Application Data

(63) Continuation of application No. 17/348,620, filed on Jun. 15, 2021, now Pat. No. 12,051,891, which is a continuation of application No. 16/693,968, filed on Nov. 25, 2019, now Pat. No. 11,038,331.

(51) Int. Cl.
| | |
|---|---|
| *H02G 3/18* | (2006.01) |
| *H01R 13/447* | (2006.01) |
| *H01R 25/00* | (2006.01) |
| *H02G 3/12* | (2006.01) |

(52) U.S. Cl.
CPC ........... *H02G 3/185* (2013.01); *H01R 13/447* (2013.01); *H01R 25/006* (2013.01); *H02G 3/12* (2013.01)

(58) Field of Classification Search
CPC ...................................... H02G 3/185
USPC .......................................... 174/57
See application file for complete search history.

(56) References Cited

U.S. PATENT DOCUMENTS

| | | | |
|---|---|---|---|
| 4,511,198 A * | 4/1985 | Mitchell | H02G 3/185 |
| | | | 439/131 |
| 5,023,396 A | 6/1991 | Bartee | |
| 6,046,405 A | 4/2000 | Obermann | |
| 10,084,337 B1 | 9/2018 | Cozzi | |
| 11,038,331 B1 | 6/2021 | Baldwin | |
| 2009/0014196 A1 | 1/2009 | Peck | |
| 2009/0306560 A1 * | 12/2009 | Lund | A61H 7/003 |
| | | | 601/134 |
| 2015/0008805 A1 | 1/2015 | Kramer | |
| 2017/0063009 A1 | 3/2017 | Los | |
| 2017/0373430 A1 * | 12/2017 | Mortun | H02G 3/185 |

* cited by examiner

*Primary Examiner* — Stanley Tso
(74) *Attorney, Agent, or Firm* — Kenneth C. Booth; Booth Udall, PLC

(57) ABSTRACT

A pop-up power system with a hollow tower to support an electrical receptacle. The lid includes a lid locking mechanism, and the tower being rotatable between a locked position and an unlocked position. A mounting sleeve receives the tower body through it and includes a locking mechanism alignable with the lid locking mechanism. A liner is positioned between the tower body and the mounting sleeve, the liner comprising a groove for the guide pin in an interior surface of the liner which surrounds and slideably engages the body and is rotatably connected to the mounting sleeve. A biasing element biases the lid of the tower away from the liner and is configured to slide between an extended position and a retracted position with respect to a mounting surface so that it has an extended locked position and an extended unlocked position, a retracted locked position and a retracted unlocked position.

15 Claims, 20 Drawing Sheets

POP-UP POWER SYSTEM

RELATED APPLICATIONS

This application is a continuation of earlier U.S. Utility patent application Ser. No. 17/348,620, filed Jun. 15, 2021, titled POP-UP POWER SYSTEM, which is a continuation of earlier U.S. Utility patent application Ser. No. 16/693,968, filed Nov. 25, 2019, that issued as U.S. Pat. No. 11,038,331 on Jun. 15, 2021, the disclosures of all of which are hereby incorporated herein by this reference.

TECHNICAL FIELD

Aspects of this document relate generally to a pop-up power system, and more specifically to a power system for installing into a top surface of a cabinet or a countertop.

BACKGROUND

The placement of electrical receptacles on or near a horizontal surface or workspace such as a countertop or a desk may provide convenient power, but that convenience comes at a cost. Placement on a wall within easy reach of the horizontal surface usually means the receptacle is very visible. In situations where a wall is not available, such as on a kitchen island or a desk pulled away from a wall, the receptacle must either be placed in a less convenient location (e.g. floor, a lower wall of a countertop, etc.) or embedded in the surface itself. Conventional receptacles used in horizontal surfaces sometimes disrupt the surface and reduce its utility. In some environments, such as a kitchen countertop, conventional receptacles are susceptible to exposure to liquids and spills.

SUMMARY

According to an aspect of the disclosure, a pop-up power system, may comprise a tower having a body that is hollow, an electrical receptacle, and a lid releasably coupled to and covering the body, the lid extending radially out beyond the body, wherein the electrical receptacle is mounted to an interior surface of the body by a first plurality of fasteners passing through both a wall of the body and the electrical receptacle hold the electrical receptacle between the wall and the bracket, the electrical receptacle comprising a face with electrical outlet openings therein that are accessible through an opening in the body of the tower, the lid further comprising a lid locking mechanism located on a perimeter of the lid, the tower further comprising at least one guide pin extending outward from the body, the tower rotatable between a locked position and an unlocked position, a mounting sleeve comprising a lip, an aperture through which the body passes, a gasket surrounding the body and positioned between the mounting sleeve and the lid, the mounting sleeve further comprising a mounting sleeve locking mechanism located on a surface of the mounting sleeve alignable with the lid locking mechanism, a liner between the tower body and the mounting sleeve, the liner comprising a groove for each of the at least one guide pins of the tower, each groove being in an interior surface of the liner, having a first segment and a second segment, and mated with a different guide pin of the at least one guide pins, the liner surrounding and slideably coupled to the body, and rotatably coupled to the mounting sleeve, and a biasing element coupled to the tower and to the liner, the biasing element biasing the lid of the tower away from the liner, wherein the tower is configured to be slidable between an extended position and a retracted position with respect to a mounting surface clamped below the lip of the mounting sleeve wherein in the extended position the electrical receptacle is positioned above the mounting surface and in the retracted position the electrical receptacle is positioned below the mounting surface, the extended position comprising an extended locked position in which the guide pins of the tower are each in the second segment of a different groove, and an extended unlocked position in which the guide pins of the tower are each in the first segment of the different groove, the retracted position comprising a retracted locked position in which the lid locking mechanism engages the mounting sleeve locking mechanism and a retracted unlocked position in which the lid locking mechanism is disengaged from the mounting sleeve locking mechanism.

Particular embodiments may comprise one or more of the following features. The biasing element may be coupled to the tower closer to the lid than to an end of the tower distal to the lid, and wherein a majority of the biasing element is inside the body of the tower when the tower is in the retracted locked position. The lid may further comprise a receiving rim projecting outward from a bottom surface, the lid releasably coupled to the body by a second plurality of fasteners passing through the wall of the body and the receiving rim of the lid.

According to an aspect of the disclosure, a pop-up power system may comprise a tower having a body that is hollow and a lid releasably coupled to and covering the body, the lid extending radially out beyond the body, the lid comprising a lid locking mechanism located on a perimeter of the lid, the tower rotatable between a locked position and an unlocked position, the tower further configured to mount an electrical receptacle to the interior surface by holding the electrical receptacle within the body through a first plurality of fasteners passing through both the wall and the electrical receptacle, wherein when the electrical receptacle, having a face with electrical outlet openings, is mounted to the interior surface, the electrical outlet openings are accessible through an opening in the body of the tower, a mounting sleeve comprising, an aperture through which the body passes, the mounting sleeve further comprising a mounting sleeve locking mechanism located on a surface of the mounting sleeve alignable with the lid locking mechanism, and a liner positioned within the mounting sleeve, and a biasing element coupled to the tower and to the liner, the biasing element biasing the lid of the tower away from the liner, wherein the tower is configured to be slidable between an extended position and a retracted position with respect to a mounting surface to which the mounting sleeve is coupled, wherein in the extended position the opening is positioned above the mounting surface and in the retracted position the opening is positioned below the mounting surface, the retracted position comprising a retracted locked position in which the lid locking mechanism engages the mounting sleeve locking mechanism and a retracted unlocked position in which the lid locking mechanism is disengaged from the mounting sleeve locking mechanism.

Particular embodiments may comprise one or more of the following features. An electrical receptacle may be coupled to the interior surface of the body by the first plurality of fasteners and a bracket. The biasing element may be coupled to the tower closer to the lid than to an end of the tower distal to the lid, and wherein a majority of the biasing element is inside the body of the tower when the tower is in the retracted locked position. The lid may further comprise a receiving rim projecting outward from a bottom surface, the lid releasably coupled to the body by a second plurality of fasteners passing through the wall of the body and the receiving rim of the lid. The mounting sleeve may further comprise a lip and a threading distal to the lip, wherein when the mounting sleeve is coupled to the mounting surface, the mounting surface is clamped between the lip and a mounting nut threadedly coupled to the threading of the mounting sleeve. A gasket may surround the body, coupled to one of the lid and the mounting sleeve, and positioned between the mounting sleeve and the lid. A liner may be positioned between the tower body and the mounting sleeve, the liner surrounding and slideably coupled to the body, and rotatably coupled to the mounting sleeve, wherein the biasing element is coupled to the mounting sleeve through the liner. The tower may further comprise at least one guide pin extending outward from the body, the liner comprises a groove for each of the at least one guide pins of the tower, each groove being in an interior surface of the liner, having a first segment and a second segment, and mated with a different guide pin of the at least one guide pins, and the extended position comprises an extended locked position in which the guide pins of the tower are each in the second segment of a different groove, and an extended unlocked position in which the guide pins of the tower are each in the first segment of the different groove.

According to an aspect of the disclosure, a pop-up power system may comprise a tower having a body that is hollow and a lid coupled to and covering the body, the lid extending radially out beyond the body, the lid comprising a lid locking mechanism configured to fix the lid in an extended position or a retracted position, the tower movable between a locked position and an unlocked position, the tower further comprising an electrical receptacle to the interior surface by holding the electrical receptacle between a wall of the body through a first plurality of fasteners passing through both the wall and the electrical receptacle, wherein when the electrical receptacle, having a face with electrical outlet openings, is mounted to the interior surface, the electrical outlet openings are accessible through an opening in the body of the tower, a mounting sleeve comprising, an aperture through which the body passes, the mounting sleeve further comprising a mounting sleeve locking mechanism located on a surface of the mounting sleeve alignable with the lid locking mechanism, and a liner positioned adjacent to the mounting sleeve, and a biasing element coupled to the tower and to the liner, the biasing element biasing the lid of the tower away from the mounting sleeve, wherein the tower is configured to be slidable between the extended position and the retracted position with respect to a mounting surface to which the mounting sleeve is coupled, wherein in the extended position the opening is positioned above the mounting surface and in the retracted position the opening is positioned below the mounting surface, the retracted position comprising a retracted locked position in which the lid locking mechanism engages the mounting sleeve locking mechanism and a retracted unlocked position in which the lid locking mechanism is disengaged from the mounting sleeve locking mechanism.

Particular embodiments may comprise one or more of the following features. An electrical receptacle may be coupled to the interior surface of the body by the first plurality of fasteners and the bracket. The lid may further comprise a receiving rim projecting outward from a bottom surface, the lid releasably coupled to the body by a second plurality of fasteners passing through the wall of the body and the receiving rim of the lid. A gasket may surround the body, coupled to one of the lid and the mounting sleeve, and positioned between the mounting sleeve and the lid. The tower may be rotatably coupled to the mounting sleeve and rotatable between a locked position and an unlocked position. A liner may be positioned between the tower body and the mounting sleeve, the liner surrounding and slideably coupled to the body, and rotatably coupled to the mounting sleeve, wherein the biasing element is coupled to the mounting sleeve through the liner, and wherein the body is rotatably coupled to the mounting sleeve through the liner. The tower may further comprise at least one guide pin extending outward from the body, the liner may comprise a groove for each of the at least one guide pins of the tower, each groove being in an interior surface of the liner, having a first segment and a second segment, and mated with a different guide pin of the at least one guide pins, and the extended position may comprise an extended locked position in which the guide pins of the tower are each in the second segment of a different groove, and an extended unlocked position in which the guide pins of the tower are each in the first segment of the different groove. The biasing element may be coupled to the tower closer to the lid than to an end of the tower distal to the lid, and wherein a majority of the biasing element is inside the body of the tower when the tower is in the retracted locked position. The mounting sleeve may further comprise a lip and a threading distal to the lip, wherein when the mounting sleeve is coupled to the mounting surface, the mounting surface is clamped between the lip and a mounting nut threadedly coupled to the threading of the mounting sleeve.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
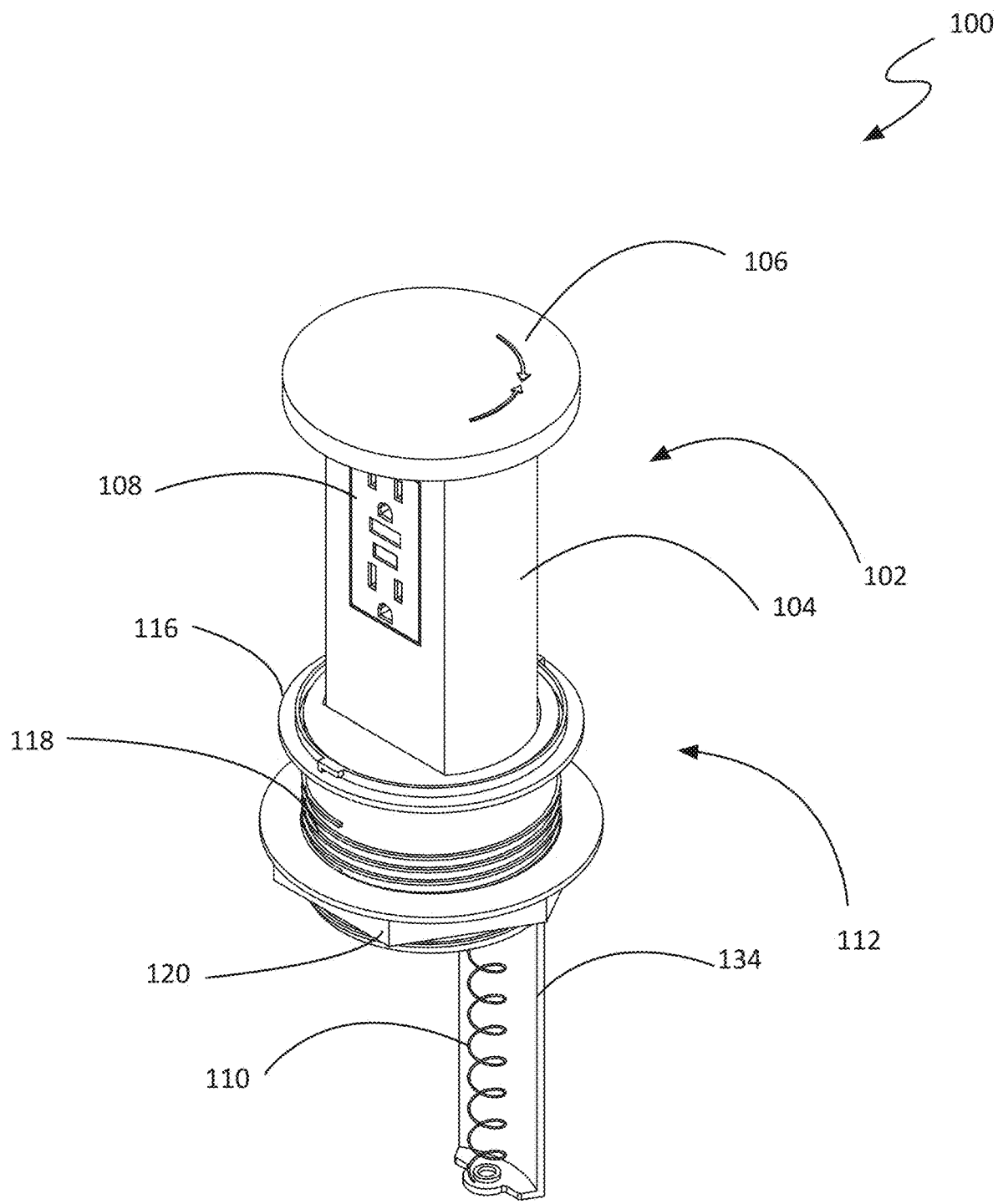
FIG. 1 is a perspective view of a pop-up power system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The placement of electrical receptacles on or near a horizontal surface or workspace such as a countertop or a desk may provide convenient power, but that convenience comes at a cost. Placement on a wall within easy reach of the horizontal surface usually means the receptacle is very visible. In situations where a wall is not available, such as on a kitchen island or a desk pulled away from a wall, the receptacle must either be placed in a less convenient location (e.g. floor, a lower wall of a countertop, etc.) or embedded in the surface itself. Conventional receptacles used in horizontal surfaces sometimes disrupt the surface and reduce its utility. In some environments, such as a kitchen countertop, conventional receptacles are susceptible to exposure to liquids and spills.

Contemplated herein is a pop-up power system that can be installed in a horizontal surface to provide convenient power without sacrificing aesthetics or reducing the usable area of the surface. When power is needed, the pop-up power system springs up from the surface with a simple twist, exposing an electrical receptacle for use. When the receptacle is no longer needed, the pop-up power system can be retracted and locked into the surface. Various embodiments provide protection against the introduction of liquid while still keeping a low profile when retracted.

Figure 2:
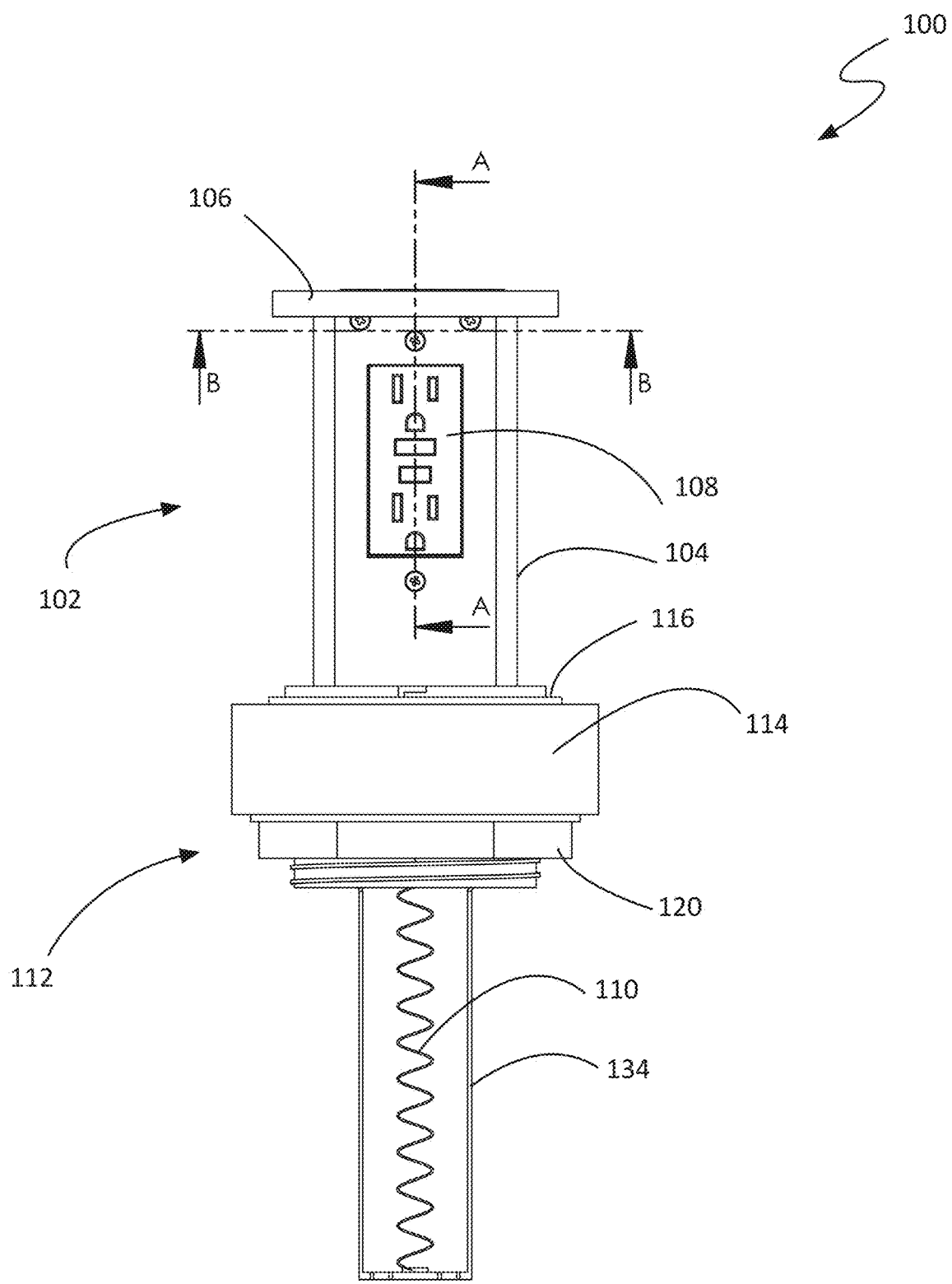
FIG. 2 is a front view of a pop-up power system.
Figure 3:
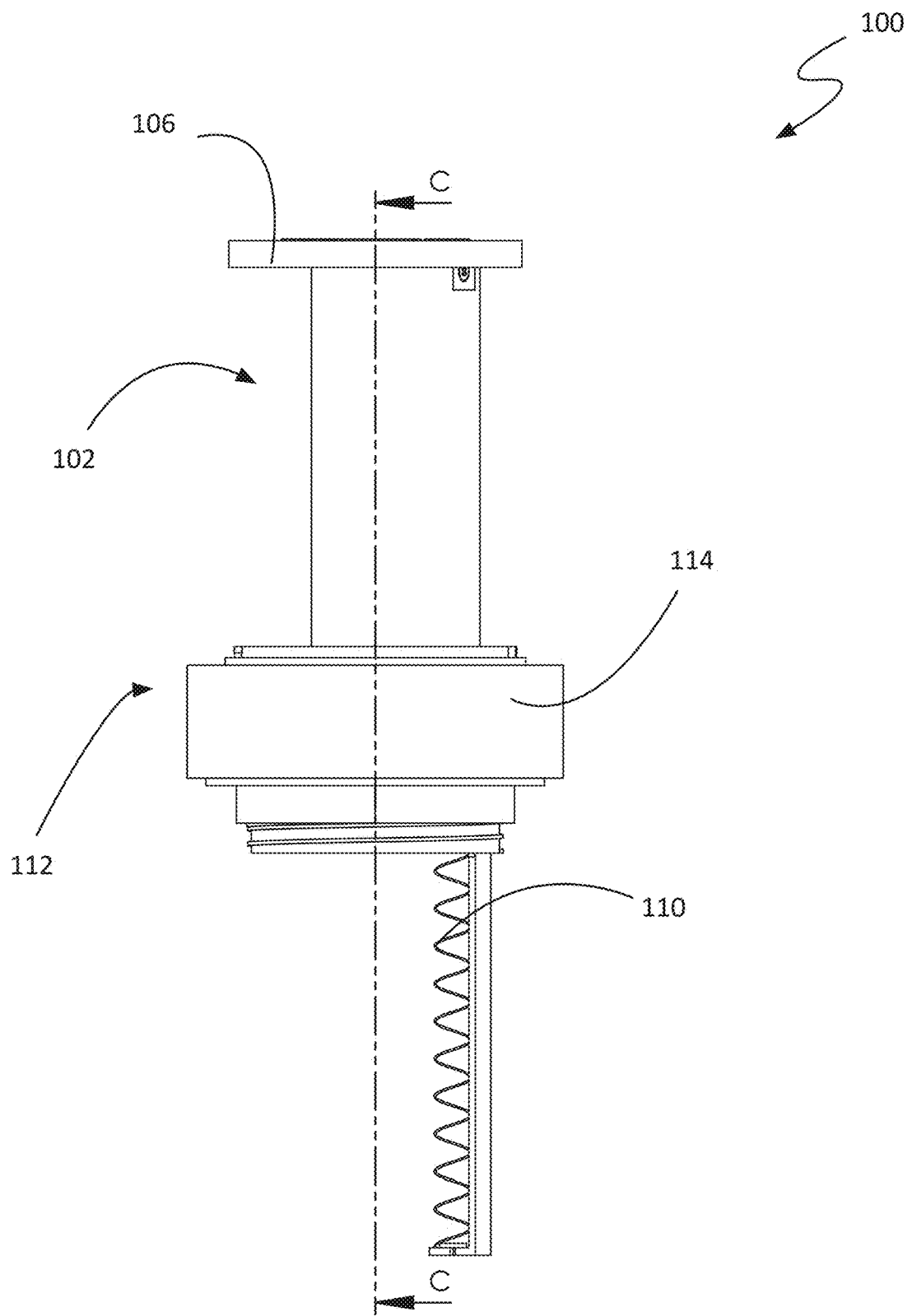
FIG. 3 is a side view of a pop-up power system.
Figure 4:
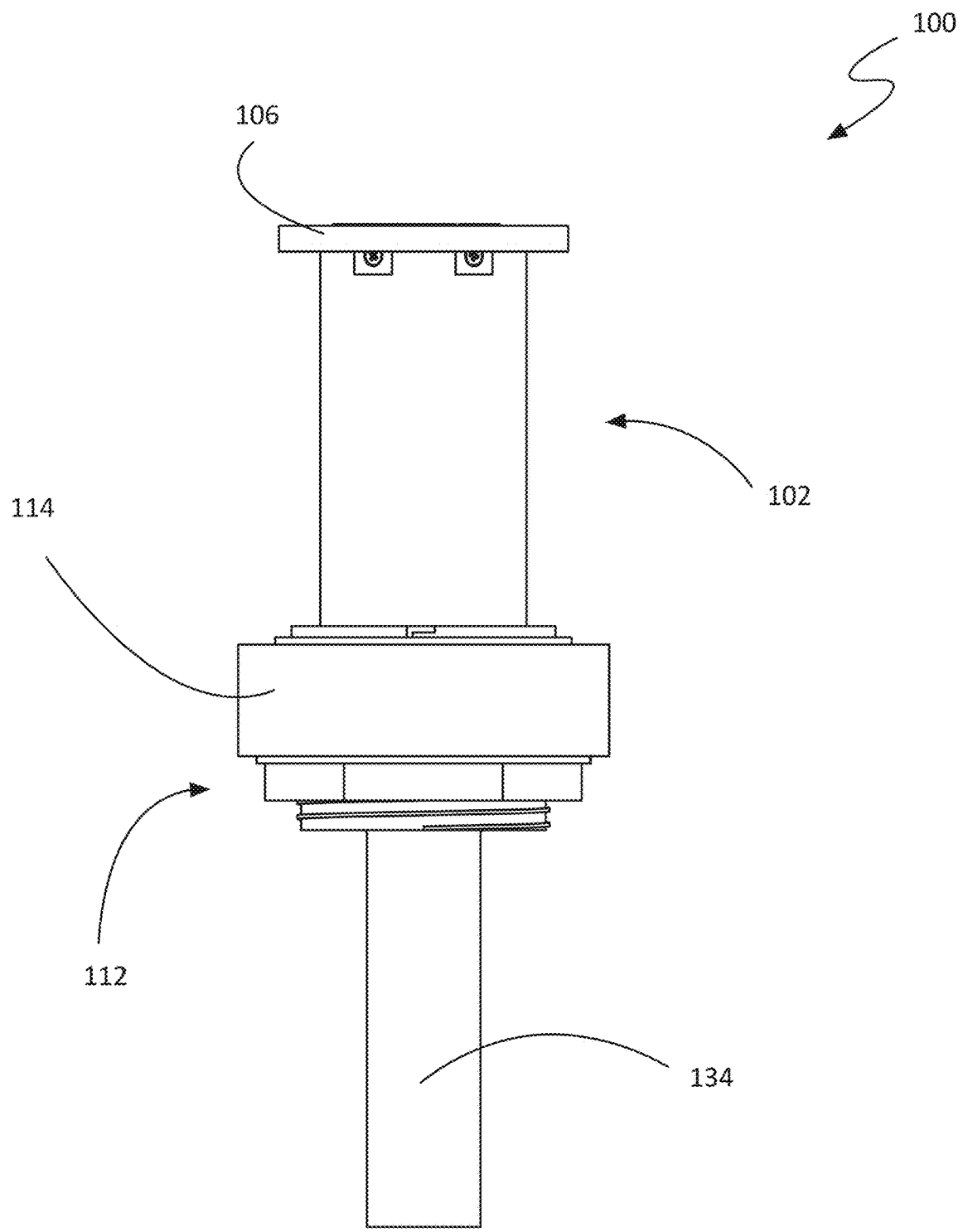
FIG. 4 is a rear view of a pop-up power system.

FIGS. 1-4 are various views of a non-limiting example of a pop-up power system. Specifically, FIG. 1 is a perspective view, FIG. 2 is a front view, FIG. 3 is a side view, and FIG. 4 is a rear view of a pop-up power system 100. As shown, the pop-up power system 100 comprises a tower 102 that houses an electrical receptacle 108. The tower 102 has a body 104 to hold the electrical receptacle 108, and a lid 106 that serves as a cover when the pop-up power system 100 is retracted into a surface. The body 104 of the tower 102 slides up and down through a mounting sleeve 112, able to move between extended and retracted positions, which will be discussed further with respect to FIGS. 5A-5C, below.

As shown, the lid 106 is attached to an end of the body 104, and extends radially outward, beyond the body 104, allowing it to function as a protective cover for the body 104, and the receptacle 108 contained within, when the tower 102 is retracted into the mounting sleeve 112. In some embodiments, the lid 106 may be releasably coupled to the body 104 of the tower 102, facilitating the installation of an electrical receptacle 108. In other embodiments, such as embodiments where the electrical receptacle 108 is incorporated into the system 100 at the time of manufacture, the lid 106 may be fixedly coupled to the body 104. The coupling of the lid 106 to the body 104 will be discussed further with respect to FIGS. 10 and 11, below.

According to various embodiments, the pop-up power system 100 may also comprise a biasing element 110 coupled to the tower 102, biasing the tower 102 toward either an extended or raised position or a retracted or lowered position. A bias towards the extended position (e.g. biasing the tower 102 so the lid 106 moves away from the mounting sleeve 112 and mounting surface 114) makes the system 100 easily utilized while maintaining a low profile when retracted (e.g. no need for a handle or pull to extract the tower 102, etc.). A bias towards the retracted position may assist in protecting the electrical receptacle 108 from liquids when stored, ensuring the lid 106 is held tightly against mounting sleeve 112. Exemplary biasing elements 110 include, but are not limited to, springs, elastomers or similar materials, magnets, and the like. Other embodiments may not include a biasing element 110, but may instead include a handle or finger-grab to allow the user to pull the pop-up power system 100 manually.

In the non-limiting example shown in FIGS. 1-4, the biasing element 110 is a spring coupled to the tower 102 and a structure that remains stationary relative to the mounting surface 114. In this case, that structure is a liner 134, which will be discussed in the context of FIG. 6, below. In other embodiments, the biasing element 110 may be coupled to the tower 102 and the mounting sleeve 112, or some other structure that remains effectively motionless relative to the mounting surface 114 as the tower 102 slides up and down.

In addition to being slideably coupled to the mounting sleeve 112, in some embodiments, the tower 102 may also be rotatable with respect to the mounting sleeve 112. This may facilitate access to the electrical receptacle 108 from a wider range of directions. As will be discussed with respect to FIGS. 5A-5C, in some embodiments, the rotation of the tower 102 may also be used to move the system 100 between a locked position, where it is maintained in a retracted or extended configuration, and an unlocked position, where the tower 102 may slide up and down, freely.

According to various embodiments, the body 104 is hollow, allowing the electrical receptacle 108 to be installed inside of the body 104, exposing the electrical outlet openings of the receptacle 108 through an opening in the body 104. The coupling of the electrical receptacle 108 to the body 104 will be discussed in greater detail with respect to FIGS. 7-9, below.

According to various embodiments, the mounting sleeve 112 comprises the necessary structure to mount the system 100 to a surface 114. For example, as shown in the non-limiting example of FIGS. 1-4, in some embodiments, the mounting sleeve 112 may comprise a lip 116 on one end, and a threading 118 at the opposite end. The mounting sleeve 112 may be feed through, or driven through, a hole in the mounting surface 114. The mounting surface 114 may then be clamped between the lip 116 and a mounting nut 120 as the nut 120 is threaded onto the threading 118 of the mounting sleeve 112. Those skilled in the art will recognize that the mounting sleeve 112 may be coupled to the mounting surface 114, or the intended location for installation, using other methods, including but not limited to, mechanical fasteners, adhesives, and the like.

According to various embodiments, the pop-up power system 100 may be installed in a horizontal surface. Examples include, but are not limited to, structural fixtures (e.g. countertops, islands, etc.), furniture (e.g. desks, workbenches, tables, etc.), and the like. In some embodiments, a system 100 may be installed at the time of manufacture of the surface 114, while in other embodiments, a system 100 may be installed in a preexisting surface or object.

Figure 5A:
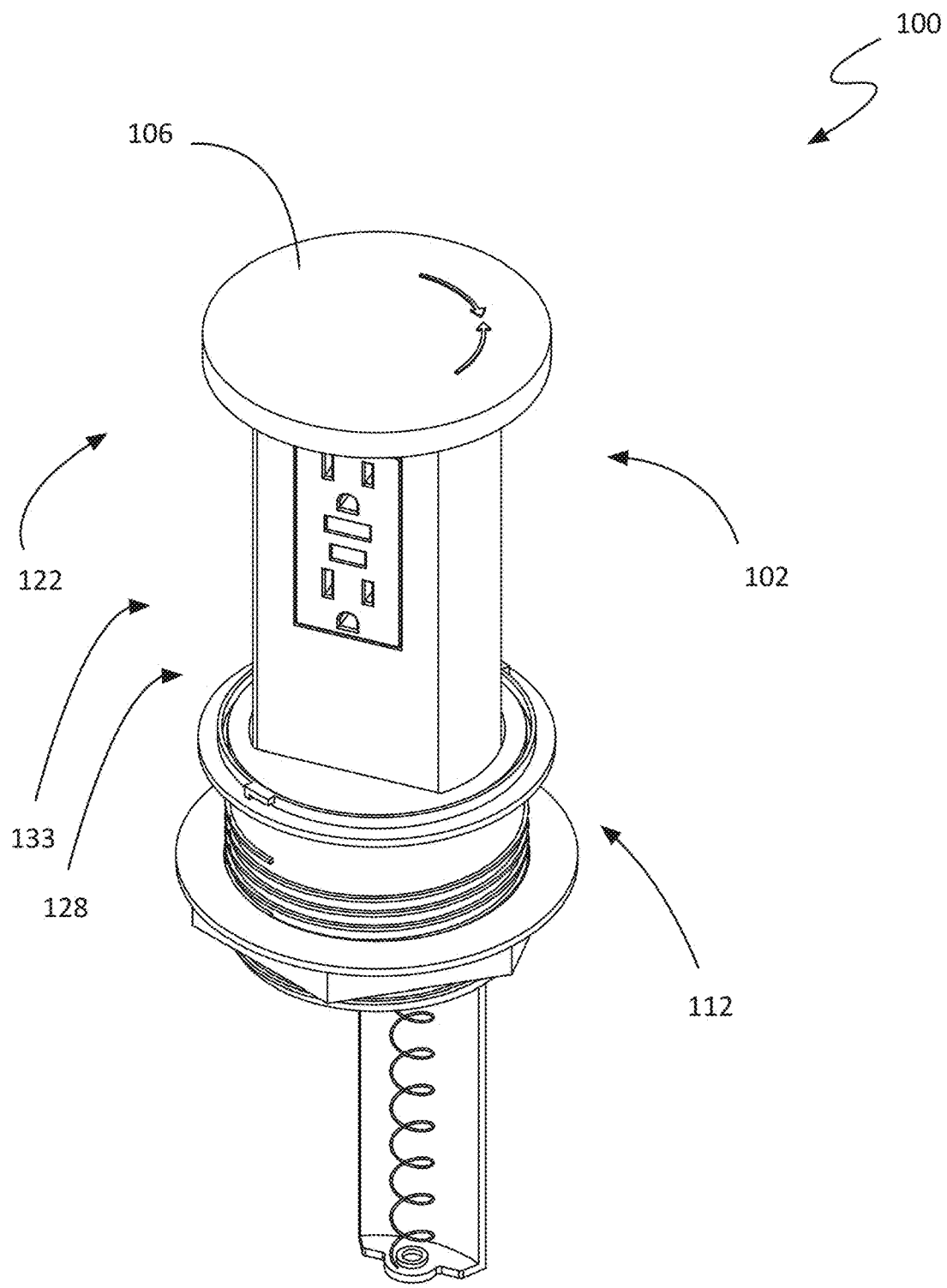
FIG. 5A is a perspective view of a pop-up power system in an extended position.
Figure 5B:
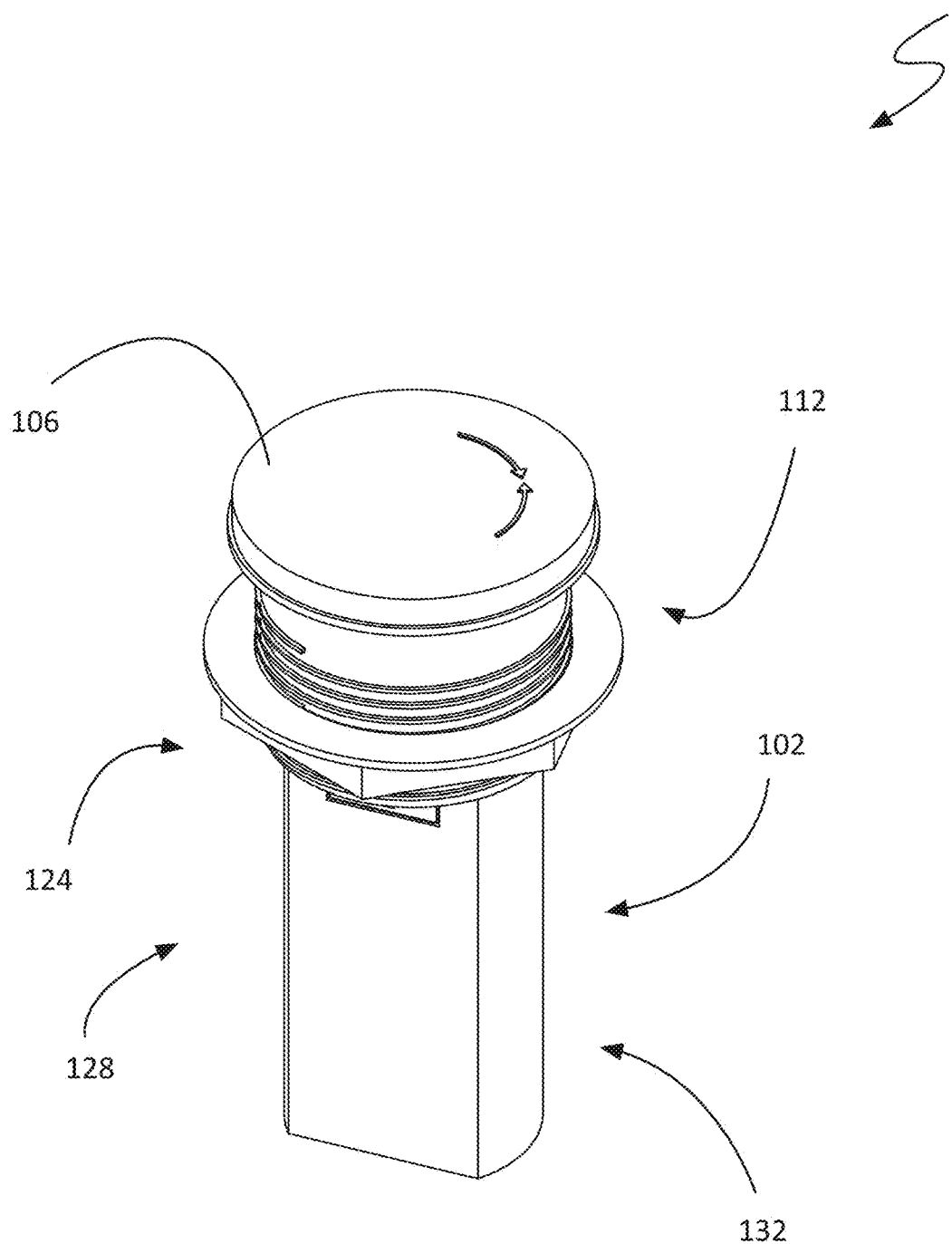
FIG. 5B is a perspective view of a pop-up power system in a retracted unlocked position.
Figure 5C:
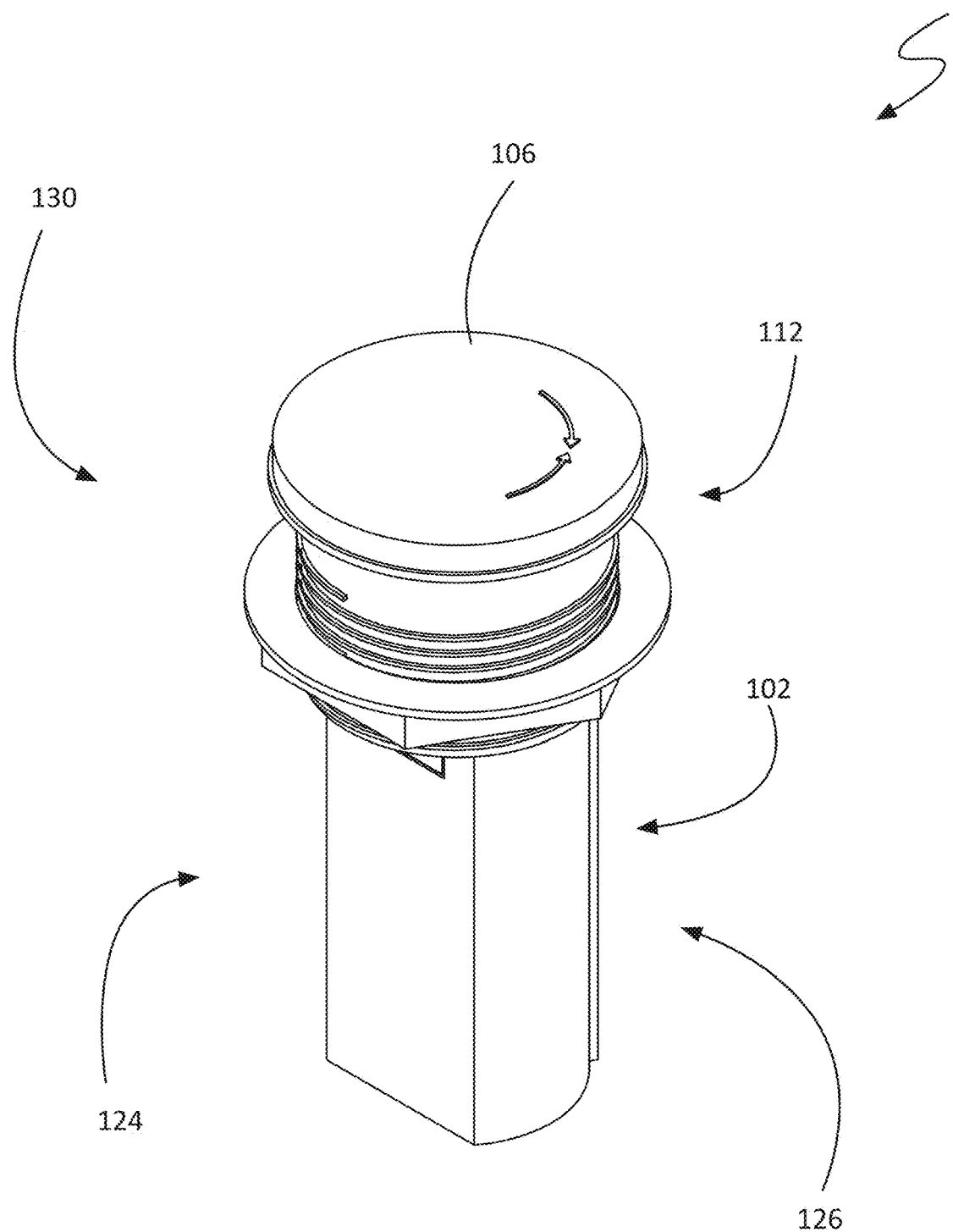
FIG. 5C is a perspective view of a pop-up power system in a retracted locked position.

FIGS. 5A-5C are perspective views of a pop-up power system 100, with the tower 102 in various positions. FIG. 5A shows a system 100 with its tower 102 in an extended position 122, while FIGS. 5B and 5C show the system 100 with its tower 102 in a retracted position 124. In the context of the present description and the claims that follow, a tower 102 is in an extended position 122 is when it has been raised up high enough that the electrical receptacle 108 is accessible for use. Furthermore, the tower 102 is in a retracted position 124 is when the electrical receptacle 108 is below the surface 114 in which the system 100 is installed. Specifically, when the receptacle 108 is below the outer surface of the mounting surface 114. In other words, the thickness of the mounting surface 114 does not affect the determination of when the tower 102 is in a retracted position 124. It should be noted that, in some embodiments, there may not be a single extended and/or retracted position. For example, in some embodiments, the tower 102 may be long enough to raise the electrical receptacle 108 beyond the point of barely being accessible, creating a range of extended positions 122.

In addition to comprising extended 122 and retracted 124 positions, the tower 102 may also comprise a locked position 126 and an unlocked position 128. FIGS. 5A and 5B are non-limiting examples of a system 100 whose tower 102 is in an unlocked position 128. In the context of the present description and the claims that follow, a tower 102 in an unlocked position 128 is able to move up and down with respect to the mounting surface 114 (and any surface or structure that is held motionless to sliding up and down relative to the mounting surface 114, such as the mounting sleeve 112 or liner 134). According to various embodiments, a tower 102 in the unlocked position 128 is able to move freely between an extended position 122 and a retracted position 124. FIG. 5A is a non-limiting example of a system 100 whose tower 102 is in an extended unlocked position 133, meaning it is extended but still able to slide up and down. FIG. 5B is a non-limiting example of a system 100 whose tower 102 is in a retracted unlocked position 132, meaning it is retracted but still able to slide up and down.

In the context of the present description and the claims that follow, a tower 102 is in a locked position 126 when it is in one of an extended position 122 and a retracted position 124, and is unable or prevented from moving to the other position. FIG. 5C is a non-limiting example of a system 100 whose tower 102 is in a retracted locked position 130, meaning it is in a retracted position 124, and is unable to change to an extended position 122 until the tower is unlocked. In some embodiments, being in a locked position 126 may also mean being prevented or unable to move to another position of the same type. As a specific example, in one embodiment, a tower 102 may have an extended locked position that inhibits movement to other extended positions 122, up or down.

According to various embodiments, a tower 102 may be rotatable between a locked position 126 and an unlocked position 128. In other embodiments, the transition between locked and unlocked positions may be triggered by a different action or motion, depending on the locking mechanism being used. Locking mechanisms will be discussed in greater detail with respect to FIG. 6, below.

In some embodiments, a tower 102 may have only a single locked position 126. For example, in some embodiments, the system 100 may only possess the structure sufficient to lock the tower in place at one position. As a specific example, in some embodiments, a tower 102 may only have a single locked position 126, that is a retracted locked position 130 that comprises the lid 106 being in contact with the mounting sleeve 112 (or an intermediary object such as a gasket 140, as will be discussed below).

In other embodiments, a system 100 may possess multiple locked positions 126. In some embodiments, a tower 102 may have one or more extended locked positions 131 in addition to a retracted locked position 130, while in others a tower 102 may only have multiple extended locked positions 131. Multiple extended locked positions 131 may be advantageous in embodiments comprising more than one electrical receptacle 108, allowing the tower 102 to be extended until a sufficient number of receptacles 108 have been accessible.

Figure 6:
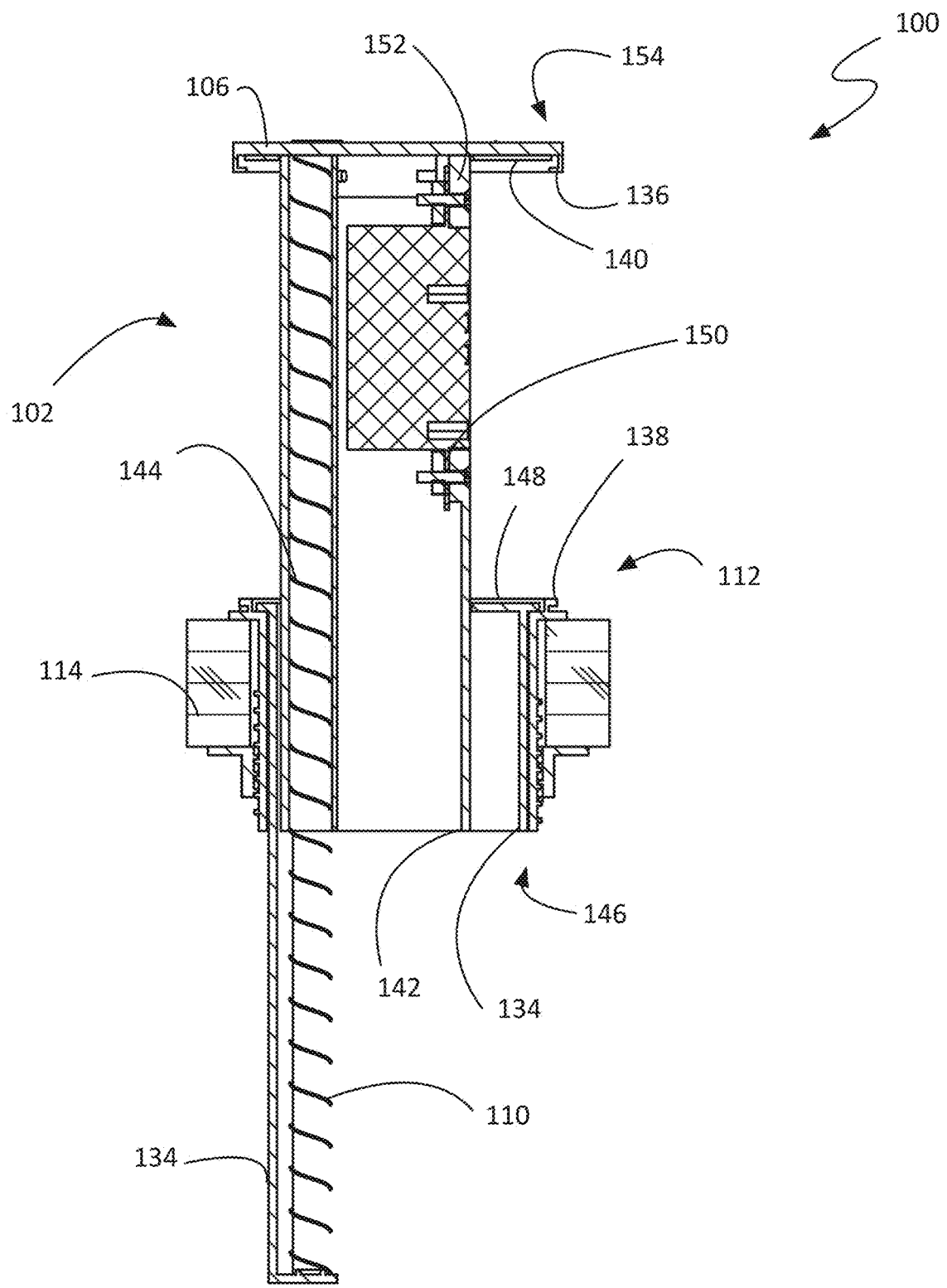
FIG. 6 is a cross-sectional view of the pop-up power system of FIG. 2 along A-A.

FIG. 6 is a cross-sectional view of the non-limiting example of a pop-up power system 100 shown in FIG. 2; the section is taken along the line A-A. As shown, the body 104 is hollow, and according to various embodiments, the electrical receptacle 108 may be mounted or affixed to the body 104 on the inside, or on an interior surface 150 of the body 104. In other embodiments, the receptacle 108 may be mounted on the other side of the wall 152 of the body 104, and only a portion of the receptacle 108 extends into the hollow area of the body 104. The mounting of the electrical receptacle 108 within the pop-up power system 100 will be discussed in greater detail with respect to FIGS. 7-9, below.

As previously mentioned, in some embodiments, the tower 102 may be able to rotate with respect to the mounting surface 114, in addition to sliding up and down through an aperture 146 in the mounting sleeve 112. In some embodiments, the tower 102 may slide up and down as well as rotate while in direct contact with the mounting sleeve 112. In other embodiments, the system 100 may comprise a liner 134 that is between the body 104 of the tower and the mounting sleeve 112. The liner 146 may be configured to surround the body 104, slideably coupling with the tower 102 allowing the up and down movement, while also rotatably coupling with the mounting sleeve 112, permitting the tower 102 to rotate with respect to the sleeve 112 (and surface 114). In embodiments where the tower 102 rotates while also being biased by a biasing element 110, the use of a liner 134 may be advantageous. Coupling the biasing element 110 to the tower 102 and the liner 134 would allow the tower 102 to be biased in the up and down direction, but still able to rotate without interference or biasing from the biasing element 110.

In some embodiments, the biasing element 110 may be located outside of the tower, or may exist only slightly inside of the hollow body 104. In other embodiments, including the non-limiting example shown in FIG. 6, the biasing element 110 may be coupled to the tower 102 at or near the lid 106 end of the body 104. In other words, in some embodiments, the biasing element 110 may be coupled to the tower 102 closer to the lid 106 than the end of the body 104 distal to the lid 106, such that a majority 144 of the biasing element 110 is inside of the tower 102 when the tower 102 is in a retracted position 124.

According to various embodiments, a system 100 may have a tower 102 capable of being put in a locked position 126 by employing a locking mechanism. For example, in some embodiments, the tower 102 may comprise a retracted locked position 130, meaning a position held that keeps the lid 106 near the mounting sleeve 112. In some embodiments, this position 130 may be achieved with a locking mechanism split between the lid 106 and the mounting sleeve 112. For example, as shown in the non-limiting example shown in FIG. 6, in some embodiments, the lid may comprise a lid locking mechanism 136 (here, the horizontal tab located on a perimeter 154 of the lid 106), and the mounting sleeve 112 may comprise a mounting sleeve locking mechanism 138 (here, the horizontal tab located on an upper surface 148 of the sleeve 112). These two locking mechanisms are alignable with each other, such that when the lid 106 is very close to or in contact with the mounting sleeve 112, rotating the tower 102 may cause the lid locking mechanism 136 to engage with the mounting sleeve locking mechanism 138 (e.g. the tabs interlock), resulting in the tower 102 moving to a retracted locked position 130. Turning the tower 102 the other direction will cause the lid 136 and sleeve 138 locking mechanisms to disengage, moving the tower 102 into an unlocked position 128.

Some embodiments may permit the tower 102 to move into a locked position 126 while in an extended position 122. Other embodiments may be able to lock into extended and retracted positions. A non-limiting example of a locking mechanism for the extended position 122 will be discussed in greater detail with respect to FIGS. 12A-E and FIGS. 13A and 13B, below.

It should be noted that the locking mechanisms shown in FIG. 6 are non-limiting examples. Those skilled in the art will recognize that other locking mechanisms, including mechanisms that do not involve rotating the tower 102, may be used. Additional examples include, but are not limited to, spring loaded magnetic release (e.g. triggered by pressing the lid 106 down into the surface 114), retractable pins or tabs that move horizontally when activated by a toggle or button, and the like.

As shown, some embodiments of the pop-up power system 100 may comprise a gasket 140, to prevent water or other liquids from running off the mounting surface 114 (e.g. a kitchen countertop, etc.) and intruding through the mounting sleeve 112 into the electrical receptacle 108 and the space below the mounting surface 114. According to various embodiments, the gasket 140 may surround the body 104, and may be positioned between the mounting sleeve 112 and the lid 106. Furthermore, the gasket 140 may be coupled to either the lid 106 or the mounting sleeve 112 or liner 134. The gasket 140 may be composed of an elastomeric material, or any other material known in the art of gaskets.

In other embodiments, the role of a gasket 140 may be played by interlocking portion of the lid 106 and mounting sleeve 112. For example, in one embodiment, the lid 106 may comprise a first barrier extending downward from the bottom of the lid 106 and the mounting sleeve 112 may comprise a second barrier extending upward from the top of the sleeve 112. When the tower 102 is in a retracted locked position 130, the two barriers may over lap, and in some embodiments may be mated, such that liquid is inhibited from intruding. In other embodiments, barriers may be used in conjunction with one or more gaskets 140. In still other embodiments, other structures, materials, or methods known in the art may be employed.

Figure 7:
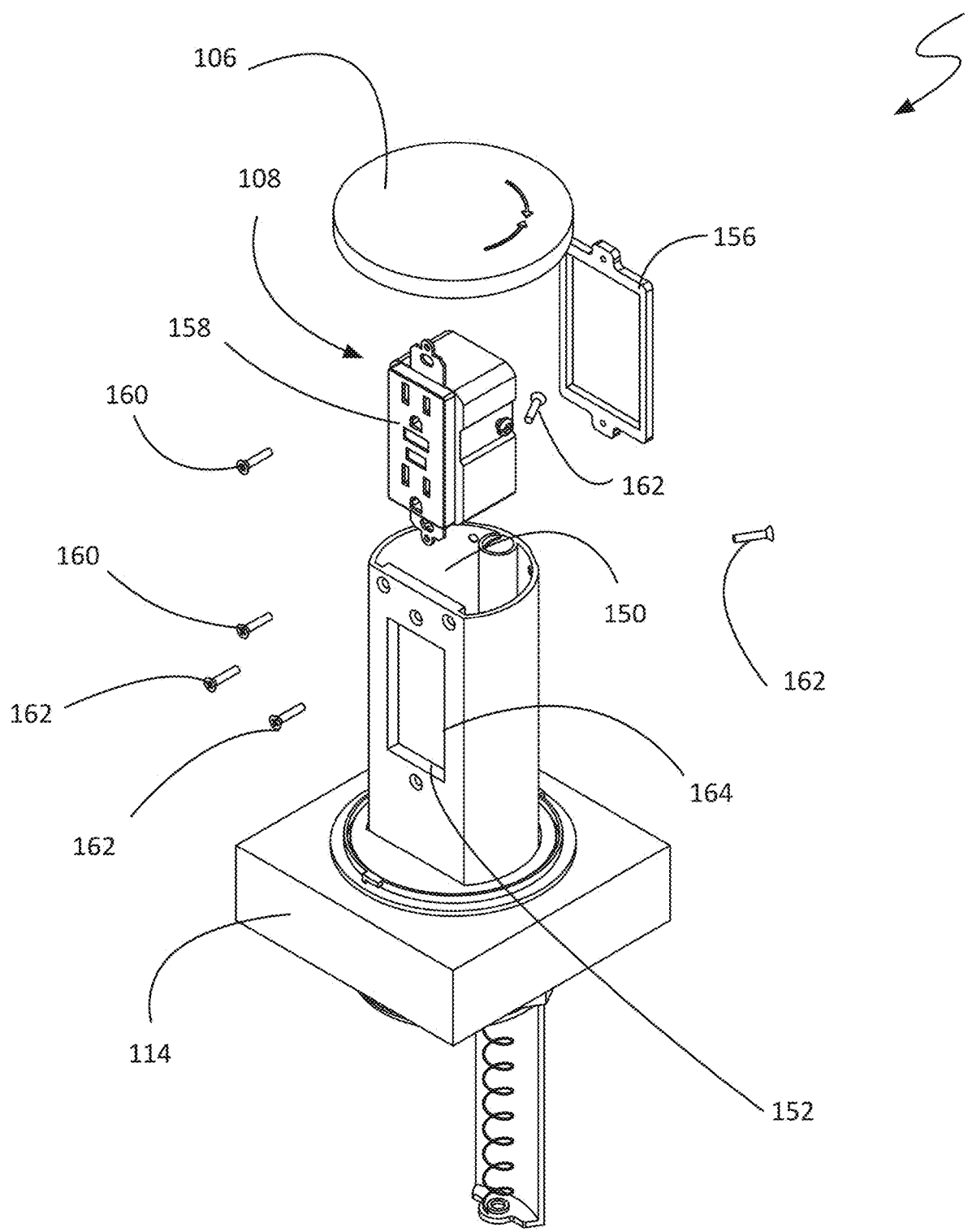
FIG. 7 is a partially exploded perspective view of a pop-up power system.
Figure 8:
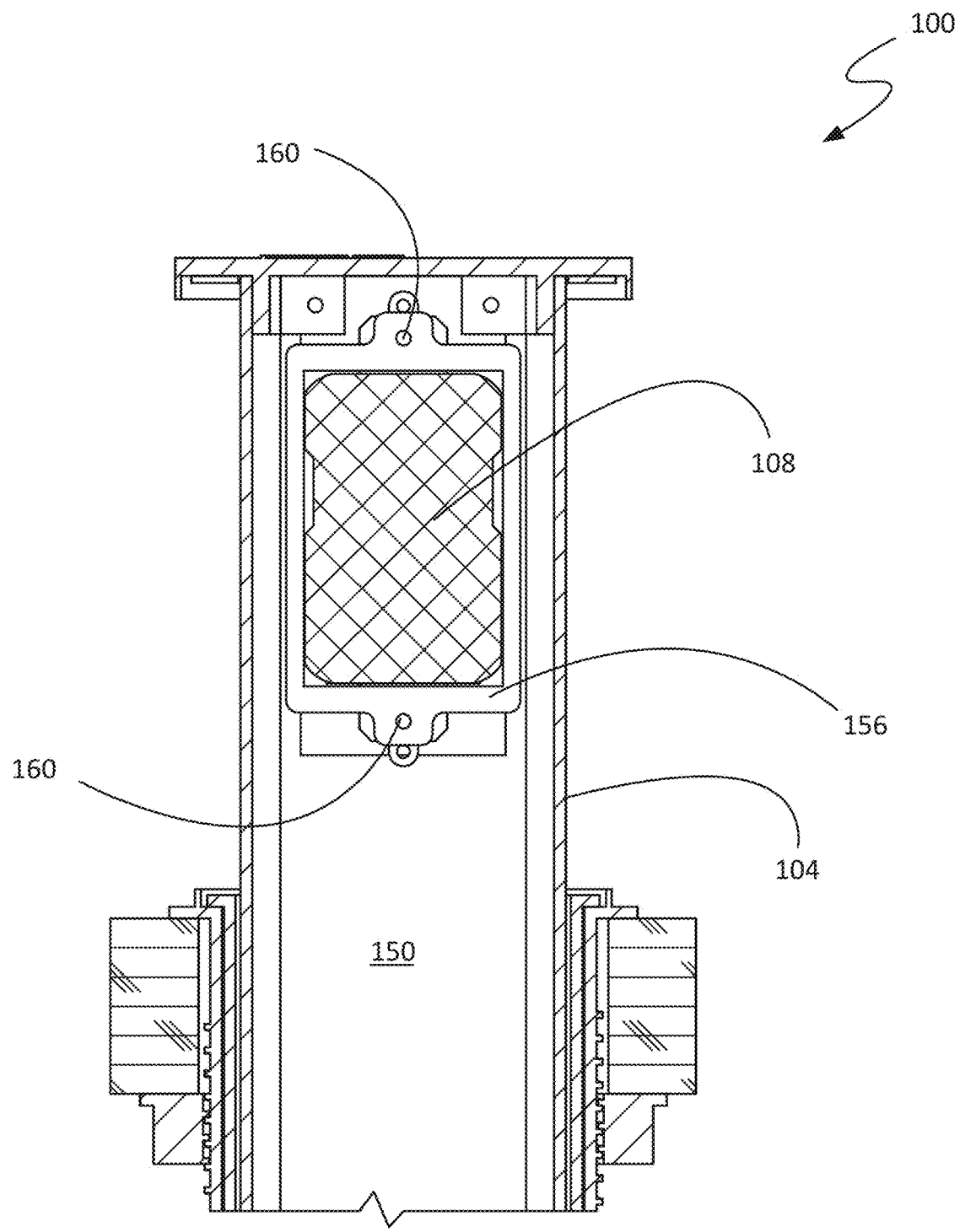
FIG. 8 is a cross-sectional view of the pop-up power system of FIG. 3 along C-C.
Figure 9:
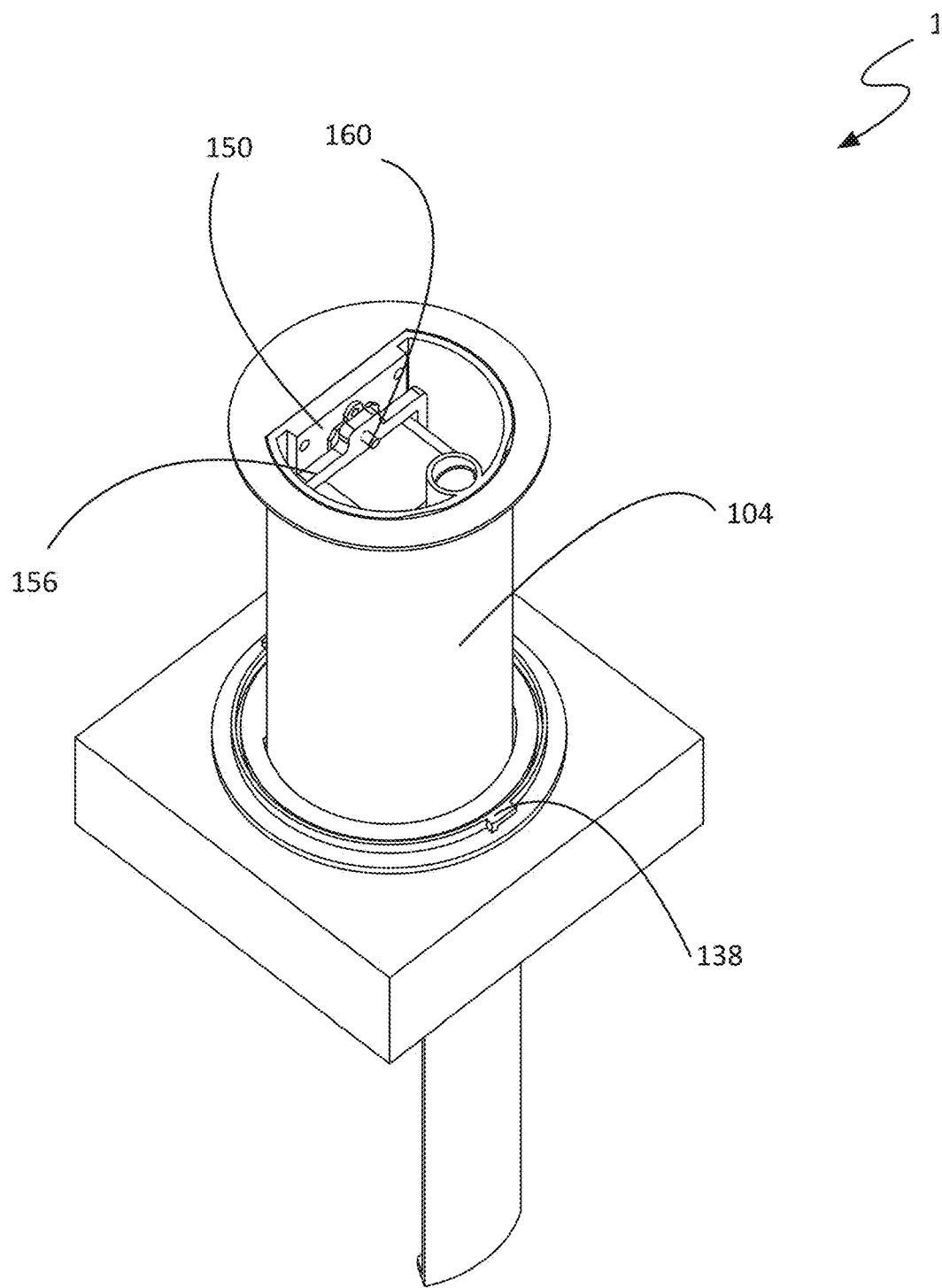
FIG. 9 is a rear perspective view of a pop-up power system with lid removed.

FIGS. 7-9 expose the internal structures of a non-limiting example of a pop-up power system 100 that attach the electrical receptacle 108 to the inside of the body 104. Specifically, FIG. 7 is a partially exploded perspective view, FIG. 8 is a cross-sectional view taken along line C-C of FIG. 3, and FIG. 9 is a rear perspective view of the system 100 with the lid 106 removed.

According to various embodiments, the electrical receptacle 108 is mounted to an interior surface 150 of the body 104 by a bracket 156 coupled to a first plurality of fasteners 160 that pass through the body wall 152, and the receptacle 108, and into the bracket 156 such that the receptacle 108 is sandwiched between the bracket 156 and the interior surface 150 of the body 104.

In the context of the present description and the claims that follow, a bracket 156 is a structure or member that is configured to receive the first plurality of fasteners 160 such that the receptacle 108 is held in place. The bracket 156 may facilitate the installation of an electrical receptacle 108. In some embodiments, there is not much space inside the hollow body 104. The bracket 156 allows the installer to line up a fastener 160 that is easy to access; once fastened, the bracket 156 is in alignment for subsequent, more difficult fastener 160 installations. The first plurality of fasteners 160 may include, but is not limited to, screws, bolts, pins, tabs, plugs, and the like.

Other embodiments may employ different methods to affix the electrical receptacle 108 within the hollow body 104. For example, in one embodiment, the receptacle 108 may be adhered to the interior surface 150, while in another embodiment, the body 104 may comprise a clip or other structure inside the hollow area that is designed to receive and latch onto a portion of the receptacle 108 upon insertion.

According to various embodiments, the method or structure used to affix the electrical receptacle 108 to the interior surface 150 also aligns the receptacle 108 with an opening 164 in the body 104 that allows access to the electrical outlet openings on the face 158 of the receptacle 108. Embodiments of the system 100 may comprise a single electrical receptacle 108, such as the non-limiting examples shown in FIGS. 1-11. In other embodiments, a system 100 may comprise multiple electrical receptacles 108, allowing for a greater number of devices to receive power. As an option, some embodiments may be lockable in multiple extended positions, exposing different numbers of receptacles 108 depending on the user's needs. The systems 100 contemplated herein may be used with any electrical receptacle, including but not limited to duplex, Decora style devices, USB interfaces, GFCI outlets, or other outlets, units or types. Some embodiments may be configured for use with devices having a similar form factor, but different function, such as controls, audio/video interfaces, and the like.

Figure 10:
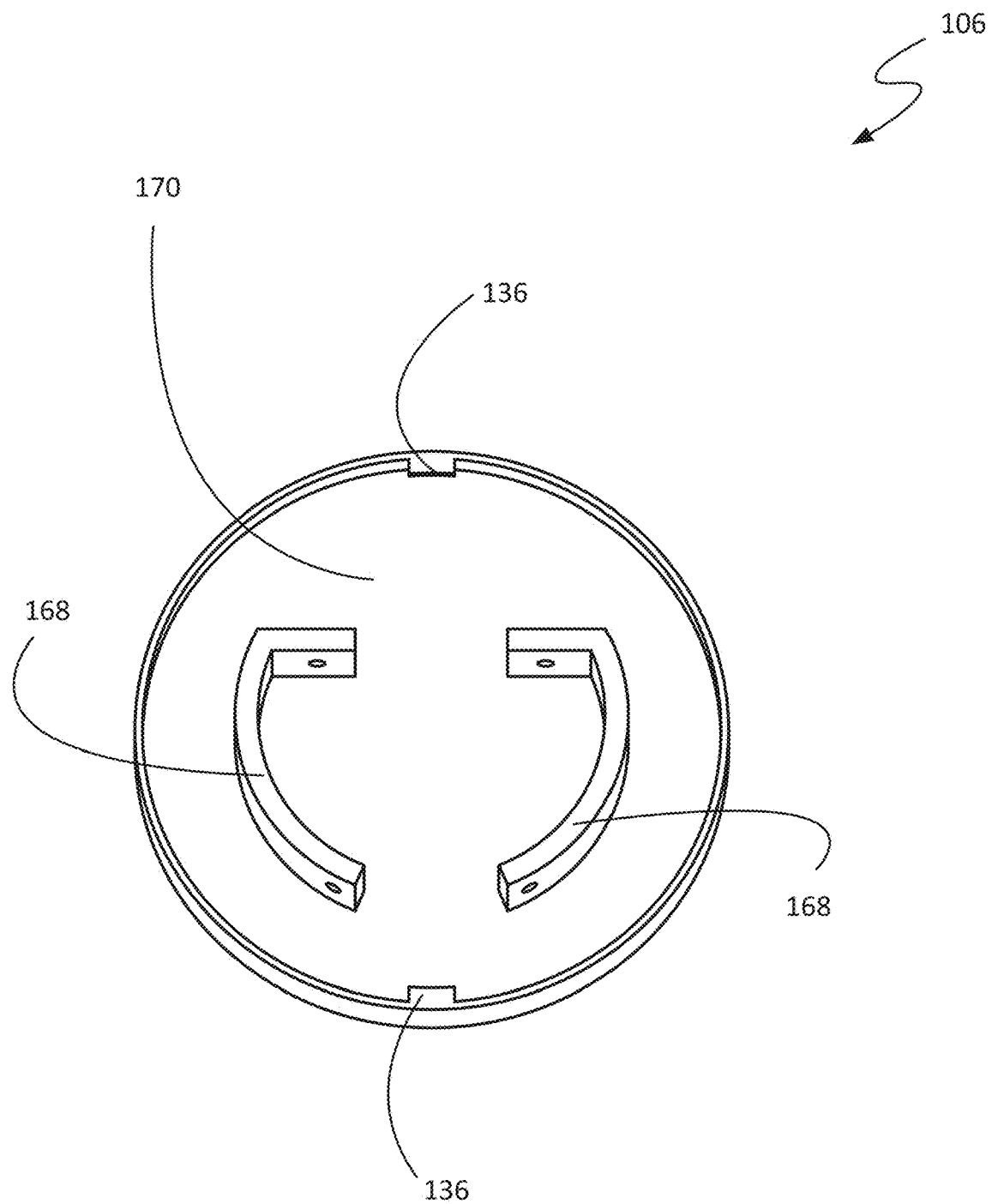
FIG. 10 is a bottom perspective view of a lid.
Figure 11:
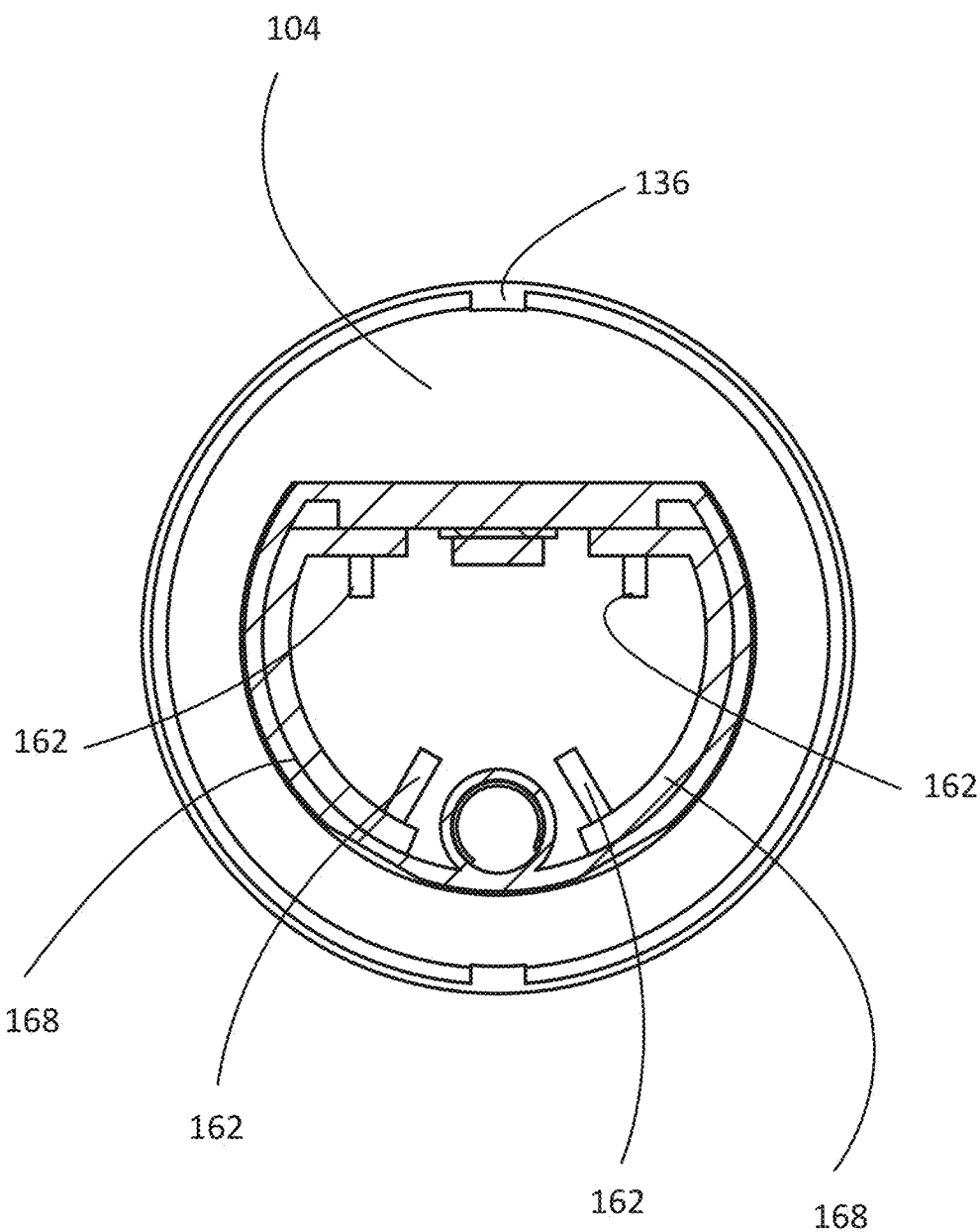
FIG. 11 is a cross-sectional view of the pop-up power system of FIG. 2 along B-B.

As previously mentioned, in some embodiments, the lid 106 may be permanently affixed to the body 104. In other embodiments, the lid 106 may be releasably coupled to the body 104, facilitating the installation of an electrical receptacle 108. FIG. 10 is a bottom perspective view of a non-limiting example of a lid 106. FIG. 11 is a cross-sectional view of the tower body 104 and a portion of a lid 106, viewed along line B-B of FIG. 2.

According to various embodiments, the lid 106 may be releasably coupled to the body 104 using a second plurality of fasteners 162. The fasteners 162 may pass through the lid 106 into the body 104, holding the lid in place. In some embodiments, the lid 106 may comprise structure or structures for the purpose of receiving these fasteners 162 without disrupting the surface of the lid 106 or interfering with efforts to inhibit the introduction of liquids to the system 100, as previously discussed.

In some embodiments, the lid may comprise one or more receiving rims 168, which project outward from the bottom surface 170 of the lid. The fasteners 162 may pass through the body 104 and the rims 168, holding the lid 106 in place without compromising the top surface of the lid 106. In some embodiments, the rims 168 may be mated with the interior surface 150 of the body 104.

Figure 12A:
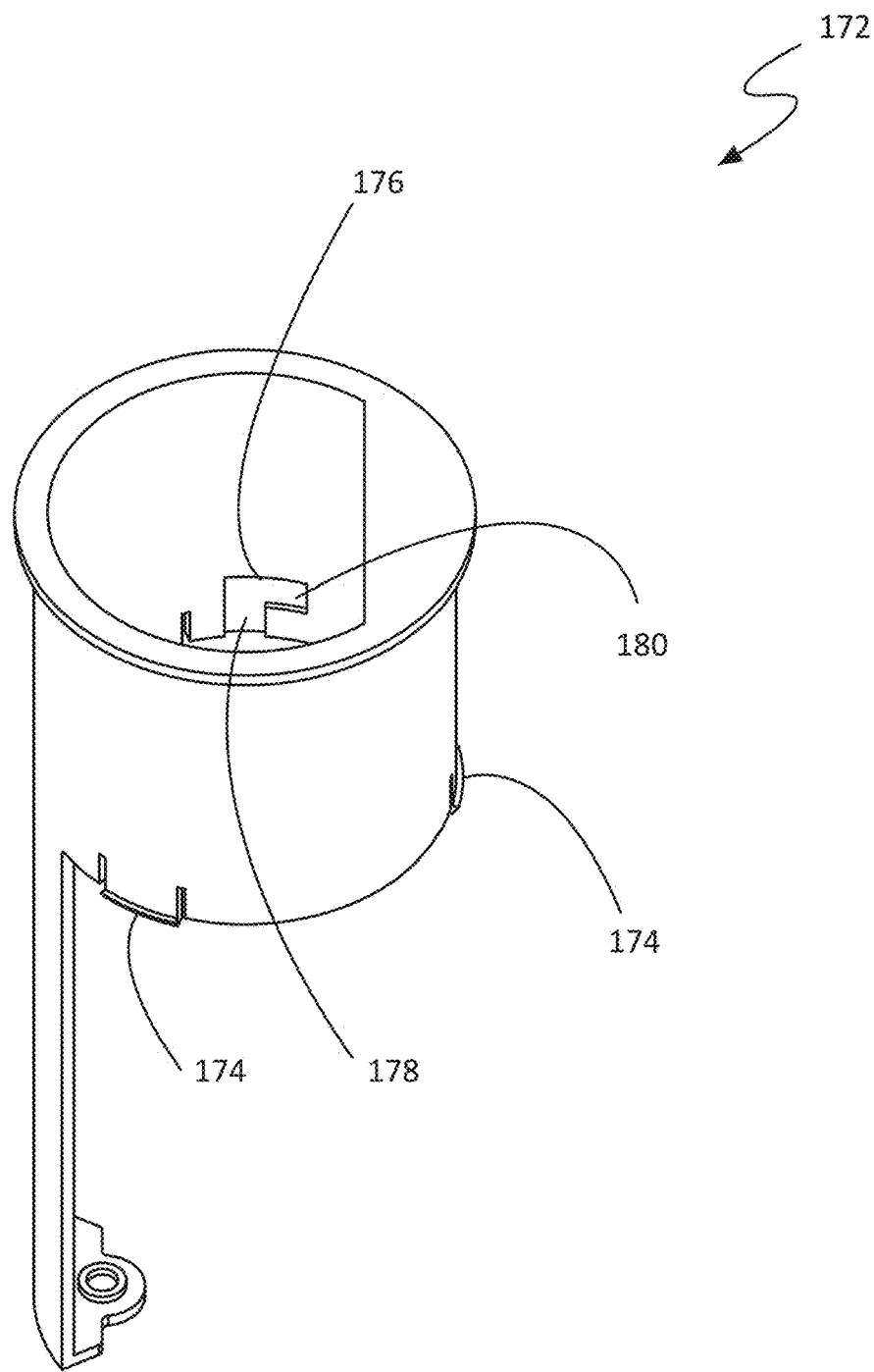
FIG. 12A is a perspective view of a liner.
Figure 12B:
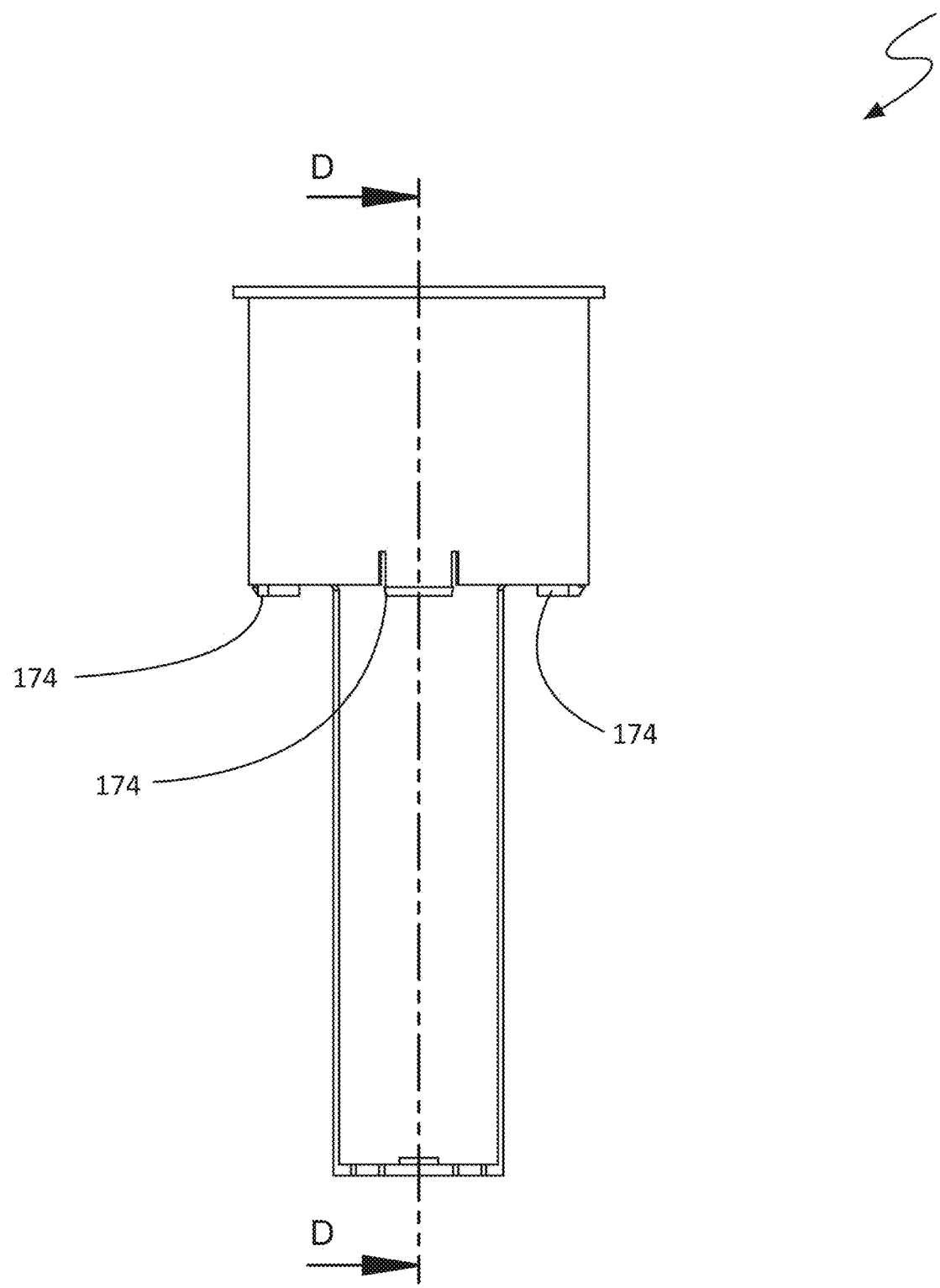
FIG. 12B is a front view of the liner of FIG. 12A.
Figure 12C:
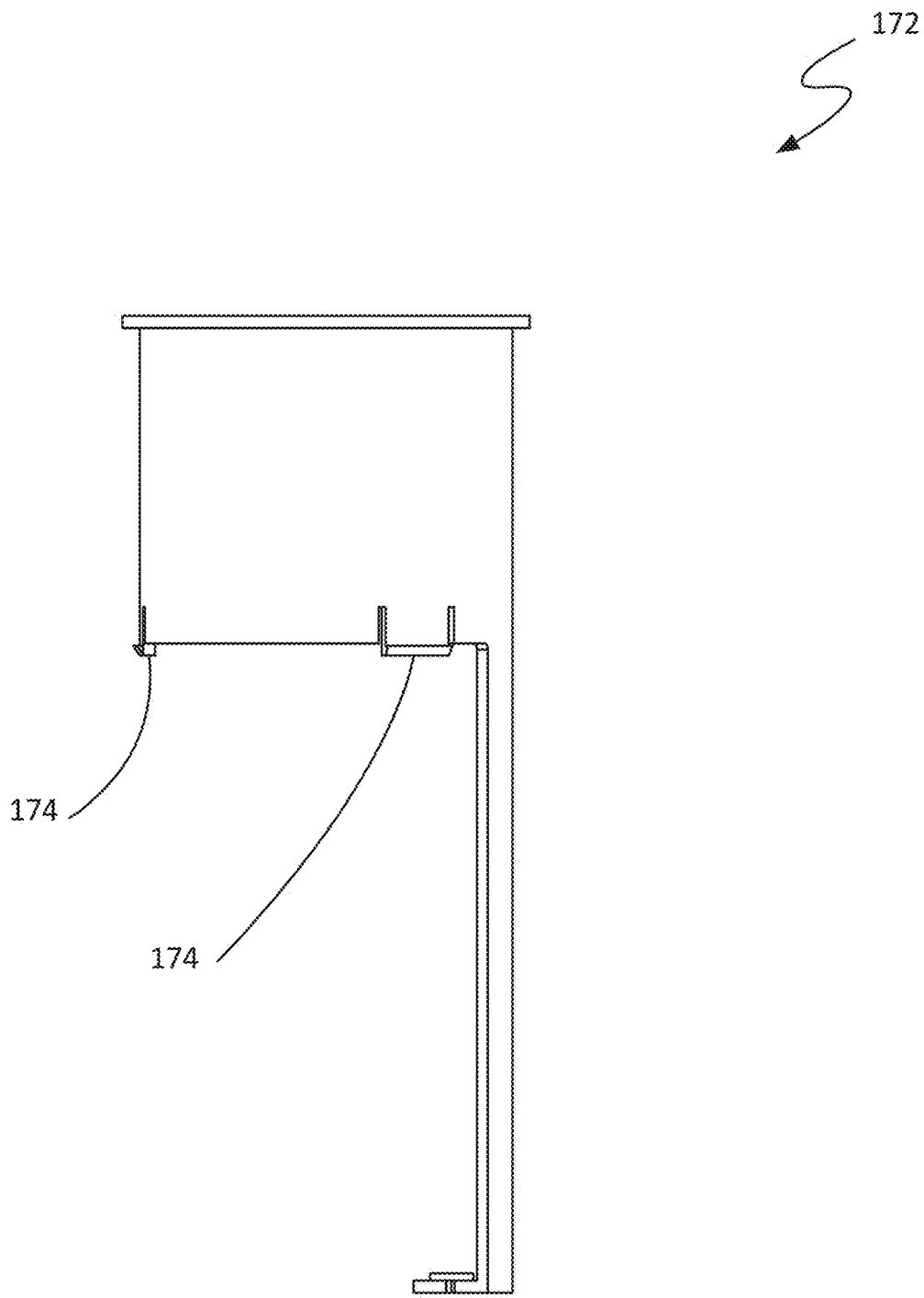
FIG. 12C is a side view of the liner of FIG. 12A.
Figure 12D:
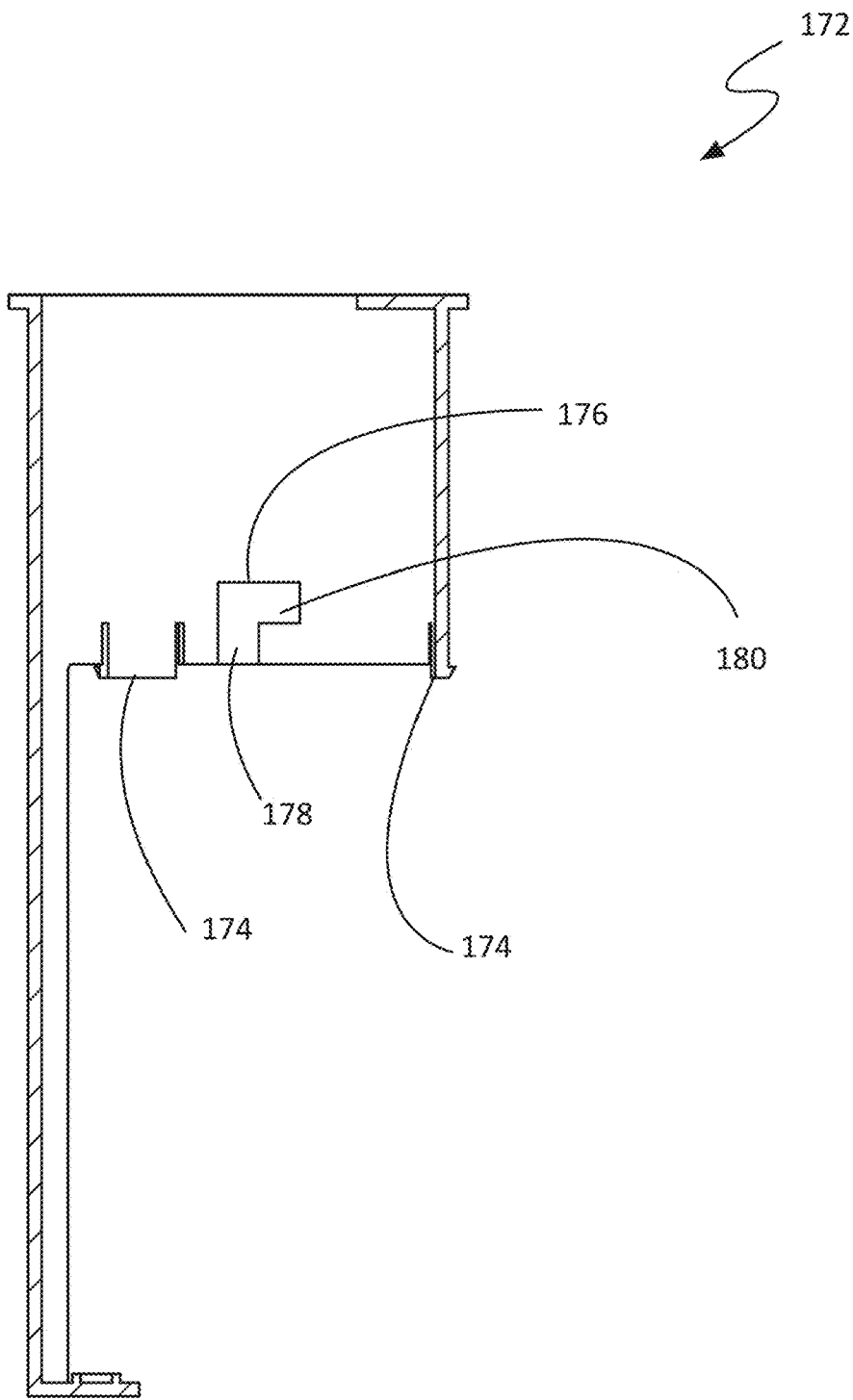
FIG. 12D is a cross-sectional view of the liner of FIG. 12B along D-D.

As previously mentioned, some embodiments of the pop-up power system 100 are able to lock in an extended position 122. FIGS. 12A-13B are various views of non-limiting examples of a liner 172 and a tower 182 configured to move into a locked position 126 while also in the extended position 122. Specifically, FIGS. 12A-12C are perspective, front, and side views of a liner 172. FIG. 12D is a cross-sectional view of the liner of FIG. 12B along D-D.

Figure 12E:
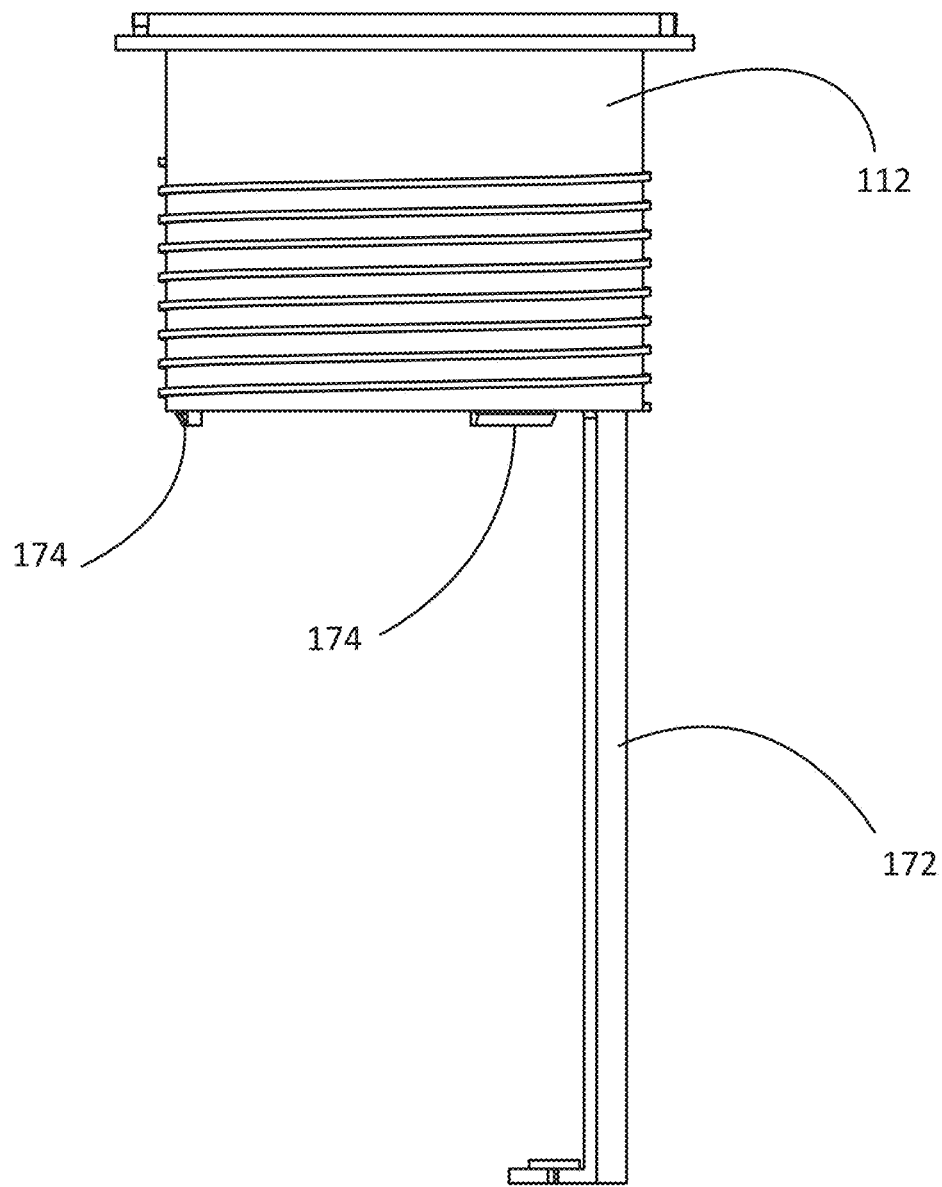
FIG. 12E is a side view of a liner coupled to a mounting sleeve.
Figure 13A:
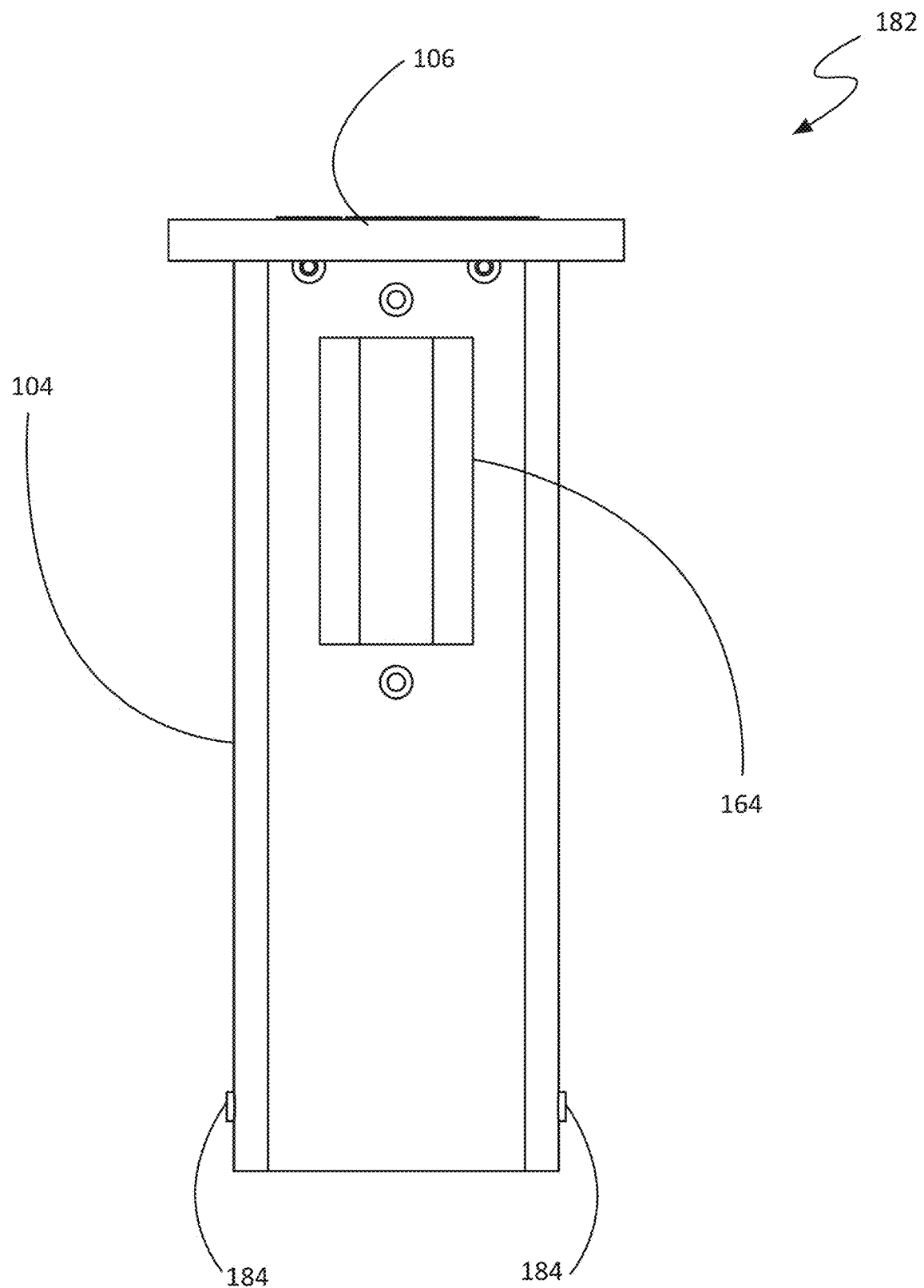
FIG. 13A is a front view of a tower.
Figure 13B:
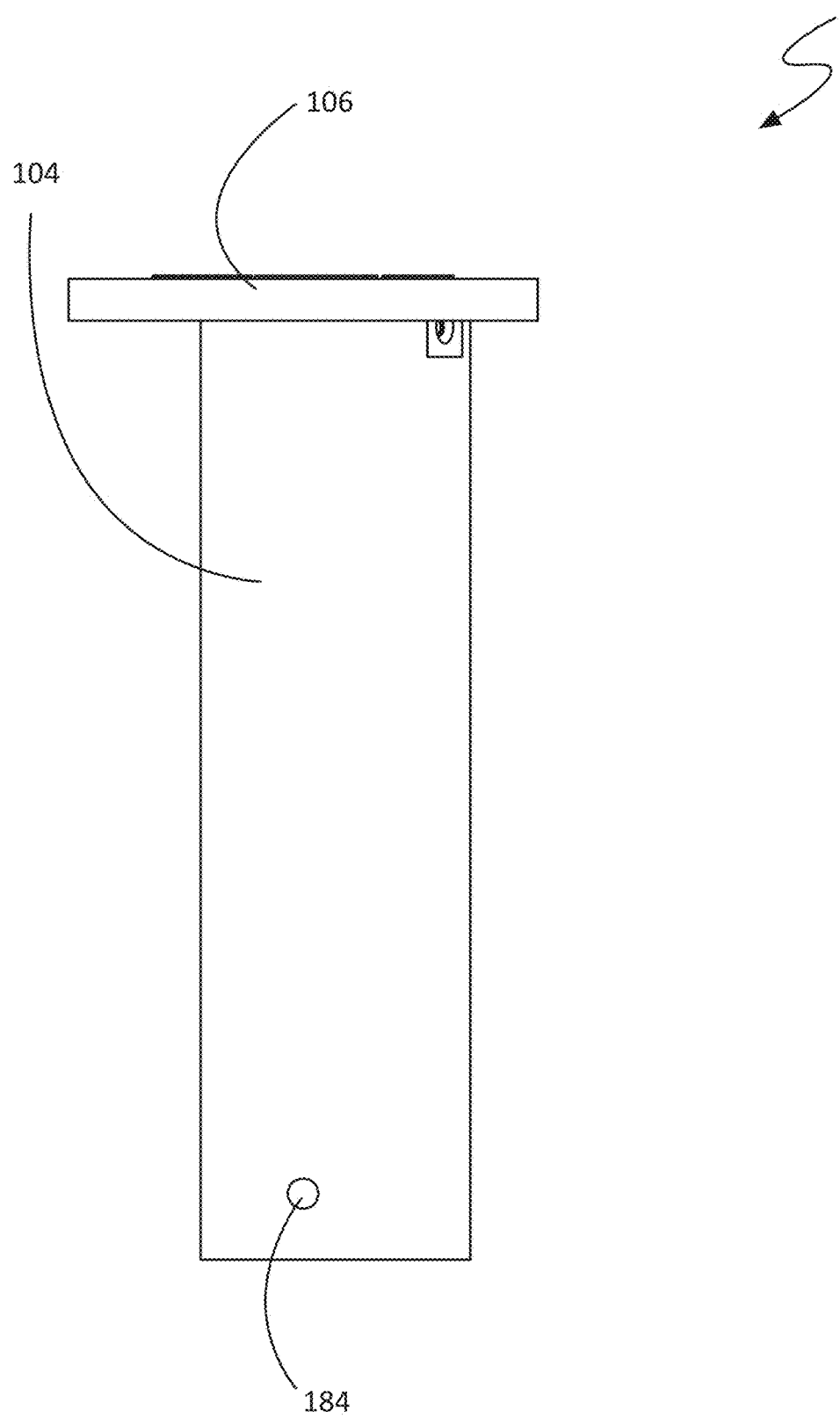
FIG. 13B is a side view of the tower of FIG. 13A.

FIG. 12E is a side view of the liner 172 of FIG. 12A coupled to a mounting sleeve 112. FIGS. 13A and 13B are front and side views of a tower 182 configured to couple with the liner 172 of FIG. 12A.

As shown in FIGS. 12A and 12D, the liner 172 may comprise one or more grooves 176 on the inner surface of the liner 172. These grooves 176 are sized and shaped to receive guide pins 184 on a tower 182, as shown in FIGS. 13A and 13B. The inverted "L" shape of the groove allows the tower 182 to slide upward into an extended position 122 while the pins 184 are in a first segment 178 of the groove 176, and then rotate into a locked position 126 as the pins 184 are in a second segment 180 of the groove 176. According to various embodiments, the first segment 178 may be approximately vertical, while the second segment 180 may be closer to horizontal, or even angled downward, allowing the tower 182 to remain in an extended position 122, even under the weight of conduits plugged into the electrical receptacle 108.

Other embodiments may implement a locking mechanism similar to the retracted locking mechanism previously discussed. Some embodiments may make use of slots in place of grooves 176. Those skilled in the art will recognize that any of the locking mechanisms previously discussed with respect to the retracted position 124 may be adapted to locking the extended position 122.

As shown, the liner 172 comprises a plurality of locking tabs 174 along the lower edge, with a barb pointing outward from the side wall of the liner 172. These locking tabs 174 are configured to prevent the liner 172 from separating from the mounting sleeve 112 once the two parts are assembled together. According to various embodiments, these locking tabs 174 are configured to deflect inward as the liner 172 is inserted into the aperture 146 of a mounting sleeve 112. Once the liner 172 is fully seated in the mounting sleeve 112, the locking tabs 174 emerge from the bottom of the mounting sleeve 112, allowing the locking tabs 174 to deflect outward, trapping the mounting sleeve 112 between the barbs of the locking tabs 174 and an upper lip of the liner 172, as shown in FIG. 12E.

It should be noted that locking tabs 174 along the lower rim of the liner 172 is a non-limiting example of a method for inhibiting the liner 172 from separating from a mounting sleeve 112 once the two have been assembled together. Examples of other structures and methods that may be used to prevent such a separation include, but are not limited to, adhesive, thermal welding, threading, pins, screws, locking collars, and the like.

It will be understood that pop-up power system implementations are not limited to the specific assemblies, devices and components disclosed in this document, as virtually any assemblies, devices and components consistent with the intended operation of a pop-up power system may be utilized. Accordingly, for example, although particular towers, bodies, lids, sleeves, liners, locks, fasteners, brackets, surfaces, biasing elements and other assemblies, devices and components are disclosed, such may include any shape, size, style, type, model, version, class, measurement, concentration, material, weight, quantity, and/or the like consistent with the intended operation of a pop-up power system. Implementations are not limited to uses of any specific assemblies, devices and components; provided that the assemblies, devices and components selected are consistent with the intended operation of a pop-up power system implementation.

Accordingly, the components defining any pop-up power system implementations may be formed of any of many different types of materials or combinations thereof that can readily be formed into shaped objects provided that the components selected are consistent with the intended operation of a pop-up power system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of pop-up power system implementations may vary according to different implementations.

Various pop-up power systems may be manufactured using conventional procedures as added to and improved upon through the procedures described here. Some components defining pop-up power system implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of pop-up power systems is not limited to a specific order of steps as disclosed in this document. Any steps or sequence of steps of the assembly of pop-up power systems indicated herein are given as examples of possible steps or a sequence of steps and not as limitations, since various assembly processes and sequences of steps may be used to assemble pop-up power systems.

The pop-up power system implementations described are by way of example or explanation and not by way of limitation. Rather, any description relating to the foregoing is for the exemplary purposes of this disclosure, and implementations may also be used with similar results for a variety of other applications requiring a pop-up power system.

What is claimed is:
1. A pop-up power system, comprising:
a tower having:
a body configured to receive an electrical receptacle mounted to the body such that when mounted, electrical outlet openings of the electrical receptacle are accessible through an opening in the body of the tower; and
a lid coupled to the body and comprising a lid locking mechanism located on a perimeter of the lid; and
a mounting sleeve configured to be disposed in a mounting surface, the mounting sleeve comprising:
an aperture sized and shaped to receive the body of the tower; and
a mounting sleeve locking mechanism located on the mounting sleeve alignable with the lid locking mechanism,
wherein when the electrical receptacle is mounted to the body and the mounting sleeve is disposed in the mounting surface, the tower is configured to be slidable within the aperture of the mounting sleeve between an extended position wherein the electrical receptacle is positioned above the mounting surface, and a retracted position wherein the electrical receptacle is positioned below the mounting surface, the retracted position comprising a retracted locked position in which the lid locking mechanism engages the mounting sleeve locking mechanism and a retracted unlocked position in which the lid locking mechanism is disengaged from the mounting sleeve locking mechanism, the extended position comprising an extended locked position in which the tower is fully extended and is fixed in relation to the mounting sleeve, and an extended unlocked position in which the tower is fully extended and is slidable in relation to the mounting sleeve, and
the tower is configured to move between the retracted unlocked position and the retracted locked position by moving in a rotational direction while remaining fixed in a vertical direction relative to the mounting sleeve.

2. The pop-up power system of claim 1, wherein the lid is configured to cover the body when in the retracted position and move in the rotational direction while remaining fixed in the vertical direction relative to the mounting sleeve when moving between the retracted unlocked position and the retracted locked position.

3. The pop-up power system of claim 2, the lid locking mechanism includes a protrusion having a top surface that is parallel with a top surface of the mounting sleeve and engages the mounting sleeve locking mechanism includes a groove defined by a bottom surface of an upper portion which is parallel with a top surface of the mounting sleeve.

4. The pop-up power system of claim 1, wherein the lid extends radially out beyond the body.

5. The pop-up power system of claim 1, the mounting sleeve further comprising a gasket surrounding the body and positioned to limit the introduction of liquid into the electrical receptacle, when the electrical receptacle is mounted to the body.

6. The pop-up power system of claim 1, further comprising a liner between the tower body and the mounting sleeve, the tower further comprising at least one guide pin extending outward from the body, the liner comprising a corresponding groove for each of the at least one guide pin of the tower, each groove extending into an interior surface of the liner and mated with a different guide pin of the at least one guide pin, the liner surrounding and slidably coupled to the body and rotatably coupled to the mounting sleeve.

7. The pop-up power system of claim 6, each corresponding groove having a first segment and a second segment, wherein when the tower is in the extended locked position, each of the at least one guide pin is in the second segment of the corresponding groove and when the tower is in the extended unlocked position, each of the at least one guide pin is in the first segment of the corresponding groove.

8. The pop-up power system of claim 1, further comprising a biasing element coupled to the tower, the biasing element configured to bias the tower toward the extended position.

9. A pop-up power system, comprising:
a tower having a body configured to receive an electrical receptacle mounted to the body such that when mounted electrical outlet openings of the electrical receptacle are accessible through an opening in the body of the tower; and
a mounting sleeve configured to be disposed in a mounting surface, the mounting sleeve comprising an aperture sized and shaped to receive the body of the tower;
wherein when the electrical receptacle is mounted to the body and the mounting sleeve is disposed in the mounting surface, the tower is configured to be slidable within the aperture of the mounting sleeve between an extended position wherein the electrical receptacle is positioned above the mounting surface, and a retracted position wherein the electrical receptacle is positioned below the mounting surface, the retracted position comprising a retracted locked position in which a lid locking mechanism engages a mounting sleeve locking mechanism and a retracted unlocked position in which the lid locking mechanism is disengaged from the mounting sleeve locking mechanism, the extended position comprising an extended locked position in which the tower is fixed in relation to the mounting sleeve and an extended unlocked position in which the tower is slidable in relation to the mounting sleeve, wherein the tower is rotatable with respect to the mounting sleeve to move between the extended locked position and the extended unlocked position and the tower is rotatable with respect to the mounting sleeve to move between the retracted locked position and the retracted unlocked position but remains fixed in a vertical direction relative to the mounting sleeve.

10. The pop-up power system of claim 9, the tower further having a lid coupled to and covering the body when in the retracted position, the lid comprising the lid locking mechanism located on a perimeter of the lid, and the mounting sleeve further comprising the mounting sleeve locking mechanism located on a surface of the mounting sleeve alignable with the lid locking mechanism, wherein the lid is configured to move between the retracted unlocked position and the retracted locked position by moving in the rotational direction while remaining fixed in the vertical direction relative to the mounting sleeve.

11. The pop-up power system of claim 9, wherein the lid extends radially out beyond the body.

12. The pop-up power system of claim 9, further comprising a liner between the tower body and the mounting sleeve, the tower further comprising at least one guide pin extending outward from the body, the liner comprising a corresponding groove for each of the at least one guide pin of the tower, each groove extending into an interior surface of the liner and mated with a different guide pin of the at least one guide pin, the liner surrounding and slidably coupled to the body and rotatably coupled to the mounting sleeve.

13. The pop-up power system of claim 12, each corresponding groove having a first segment and a second segment, wherein when the tower is in the extended locked position, each of the at least one guide pin is in the second segment of the corresponding groove and when the tower is in the extended unlocked position, each of the at least one guide pin is in the first segment of the corresponding groove.

14. The pop-up power system of claim 12, further comprising a biasing element coupled to the tower, the biasing element configured to bias the tower toward the extended position.

15. The pop-up power system of claim 9, the mounting sleeve further comprising a gasket surrounding the body and positioned to limit the introduction of liquid into the electrical receptacle, when the electrical receptacle is mounted to the body.

* * * * *